US012649632B1

(12) United States Patent
Zilio et al.

(10) Patent No.: US 12,649,632 B1
(45) Date of Patent: Jun. 9, 2026

(54) DUST CONTROL SYSTEM FOR SPOT FILTERS

(71) Applicant: Ag Growth International Inc., Winnipeg (CA)

(72) Inventors: Guilherme Sfatoski Zilio, Assis (BR); Bruno Vinicius Baptista De Oliveira, Ourinhos (BR); Paulo Sergio Terron, Assis (BR)

(73) Assignee: Ag Growth International Inc., Winnipeg (CA)

( * ) Notice: Subject to any disclaimer, the term of this patent is extended or adjusted under 35 U.S.C. 154(b) by 0 days.

(21) Appl. No.: 19/376,869

(22) Filed: Oct. 31, 2025

(51) Int. Cl.
| | |
|---|---|
| *B65G 69/18* | (2006.01) |
| *B01D 46/44* | (2006.01) |
| *B01D 46/48* | (2006.01) |
| *B01D 46/71* | (2022.01) |
| *B08B 15/02* | (2006.01) |
| *B07B 4/08* | (2006.01) |

(52) U.S. Cl.
CPC ............. B65G 69/18 (2013.01); B01D 46/44 (2013.01); B01D 46/48 (2013.01); B01D 46/71 (2022.01); *B01D 2221/06* (2013.01); *B07B 4/08* (2013.01); *B08B 15/02* (2013.01)

(58) Field of Classification Search
None
See application file for complete search history.

(56) References Cited

U.S. PATENT DOCUMENTS

| | | | |
|---|---|---|---|
| 5,110,331 A | 5/1992 | Williams | |
| 5,584,913 A | 12/1996 | Williams | |
| 6,056,797 A | 5/2000 | Richard | |
| 6,073,905 A | 6/2000 | Wilson | |
| 7,407,346 B2 | 8/2008 | McConnell | |
| 11,931,681 B2 | 3/2024 | Raether | |
| 2003/0089234 A1 | 5/2003 | Bjarno et al. | |
| 2021/0053829 A1* | 2/2021 | Tanner | ................... B01J 8/0055 |
| 2022/0314158 A1* | 10/2022 | Huskisson | ........... B01D 46/001 |

FOREIGN PATENT DOCUMENTS

| | | |
|---|---|---|
| BR | 9201489 A | 12/1992 |
| BR | 9503138 A | 5/1996 |
| BR | 0107966 B1 | 1/2009 |
| BR | 112015021316 B1 | 11/2021 |
| BR | 102023020061 A2 | 4/2025 |

\* cited by examiner

*Primary Examiner* — Gabriel E Gitman
(74) *Attorney, Agent, or Firm* — Shook, Hardy & Bacon L.L.P.

(57) ABSTRACT

The present disclosure provides a dust control system for use with a spot dust filter mounted on industrial equipment, comprising a housing positioned between the spot dust filter and the industrial equipment, the housing defining an internal chamber, a plenum within the housing configured to accommodate pressure changes, a first valve positioned to control airflow between the spot dust filter and the industrial equipment, a second valve and a third valve arranged in series to form an airlock mechanism for controlling dust discharge into the industrial equipment, and a control system configured to intercept a cleaning signal from the spot dust filter and coordinate operation of the first valve, second valve, and third valve to isolate cleaning pulses from the industrial equipment while allowing collected dust to be discharged into the industrial equipment through the airlock mechanism.

20 Claims, 14 Drawing Sheets

5000

502 — INTERCEPT CLEANING SIGNAL FROM SPOT DUST FILTER

504 — CLOSE FIRST VALVE TO ISOLATE SPOT FILTER

506 — ALLOW CLEANING PULSE TO BE CONTAINED IN PLENUM

508 — COLLECT DISLODGED DUST IN INTERMEDIATE CHAMBER

510 — OPEN SECOND VALVE TO TRANSFER DUST

512 — CLOSE SECOND VALVE

514 — OPEN THIRD VALVE TO DISCHARGE DUST

516 — REOPEN FIRST VALVE TO RESTORE FILTRATION

NEGATIVE PRESSURE

POSITIVE PRESSURE PULSE

DUST CONTROL SYSTEM FOR SPOT FILTERS

FIELD OF INVENTION

The present disclosure relates to dust control systems for industrial material handling equipment, and more particularly to a dust control system that isolates cleaning pulses from spot dust filters to prevent fugitive dust emissions in industrial equipment applications.

BACKGROUND

Industrial material handling systems commonly employ various types of equipment to transport, process, and handle bulk materials such as grain, cement, flour, and other powdered or granular substances through processing facilities. These systems may include conveyor systems, mixing equipment, processing machinery, packaging systems, and other industrial equipment that handle particulate materials. During material transport and processing operations, dust particles naturally become airborne, creating potential health hazards, contamination risks, and regulatory compliance issues. To address these concerns, dust collection systems are typically integrated with industrial equipment to capture and contain airborne particulates.

Spot dust filters represent one category of dust collection equipment commonly used in material handling applications. These devices are typically mounted directly on industrial equipment housings and operate by creating negative pressure within the equipment to draw dust-laden air through filter elements. The filtered air is then discharged to the atmosphere while collected dust particles accumulate on the filter media. To maintain filtration efficiency, spot filters periodically undergo cleaning cycles where compressed air pulses are directed through the filter elements in reverse direction to dislodge accumulated dust, which then falls back into the material stream.

The cleaning process in conventional spot filter systems involves brief but intense compressed air pulses that momentarily reverse the airflow direction and create positive pressure within the equipment housing. While this cleaning mechanism effectively removes dust from filter elements, the sudden pressure change can cause fugitive dust emissions through gaps, joints, and sealing interfaces in the equipment structure. In standard industrial applications, such minor dust emissions are generally acceptable and within regulatory limits.

However, certain specialized applications, particularly in food processing and pharmaceutical manufacturing, impose more stringent cleanliness standards that may exceed the capabilities of conventional spot filter systems. These environments often require enhanced dust containment measures to maintain product quality, prevent cross-contamination, and comply with regulatory requirements for sanitary conditions.

Alternative dust collection approaches, such as centralized vacuum systems, can provide enhanced dust containment but typically involve higher capital costs, more complex installation requirements, and greater space demands. Additionally, retrofitting existing industrial equipment with centralized dust collection may present practical challenges in facilities with space constraints or established equipment layouts.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

The present disclosure provides a dust control system for use with spot dust filters mounted on industrial equipment, comprising a housing positioned between the spot dust filter and industrial equipment that defines an internal chamber, a plenum configured to accommodate pressure changes, a first valve controlling airflow between the spot dust filter and industrial equipment, second and third valves arranged in series to form an airlock mechanism for controlling dust discharge, and a control system that intercepts cleaning signals from the spot dust filter and coordinates valve operations to isolate cleaning pulses from the industrial equipment while allowing collected dust discharge through the airlock mechanism. The system operates by intercepting cleaning signals from spot dust filters, closing isolation valves, containing cleaning pulses within plenums, collecting dislodged dust in intermediate chambers, and sequentially operating airlock valves to discharge dust into industrial equipment while maintaining system isolation.

The foregoing general description of the illustrative embodiments and the following detailed description thereof are merely exemplary aspects of the teachings of this disclosure and are not restrictive.

BRIEF DESCRIPTION OF FIGURES

The above and other objectives, features, and other advantages of the present disclosure will be more clearly understood from the following detailed description when taken in conjunction with the accompanying drawings, in which.

DETAILED DESCRIPTION

Figure 1:
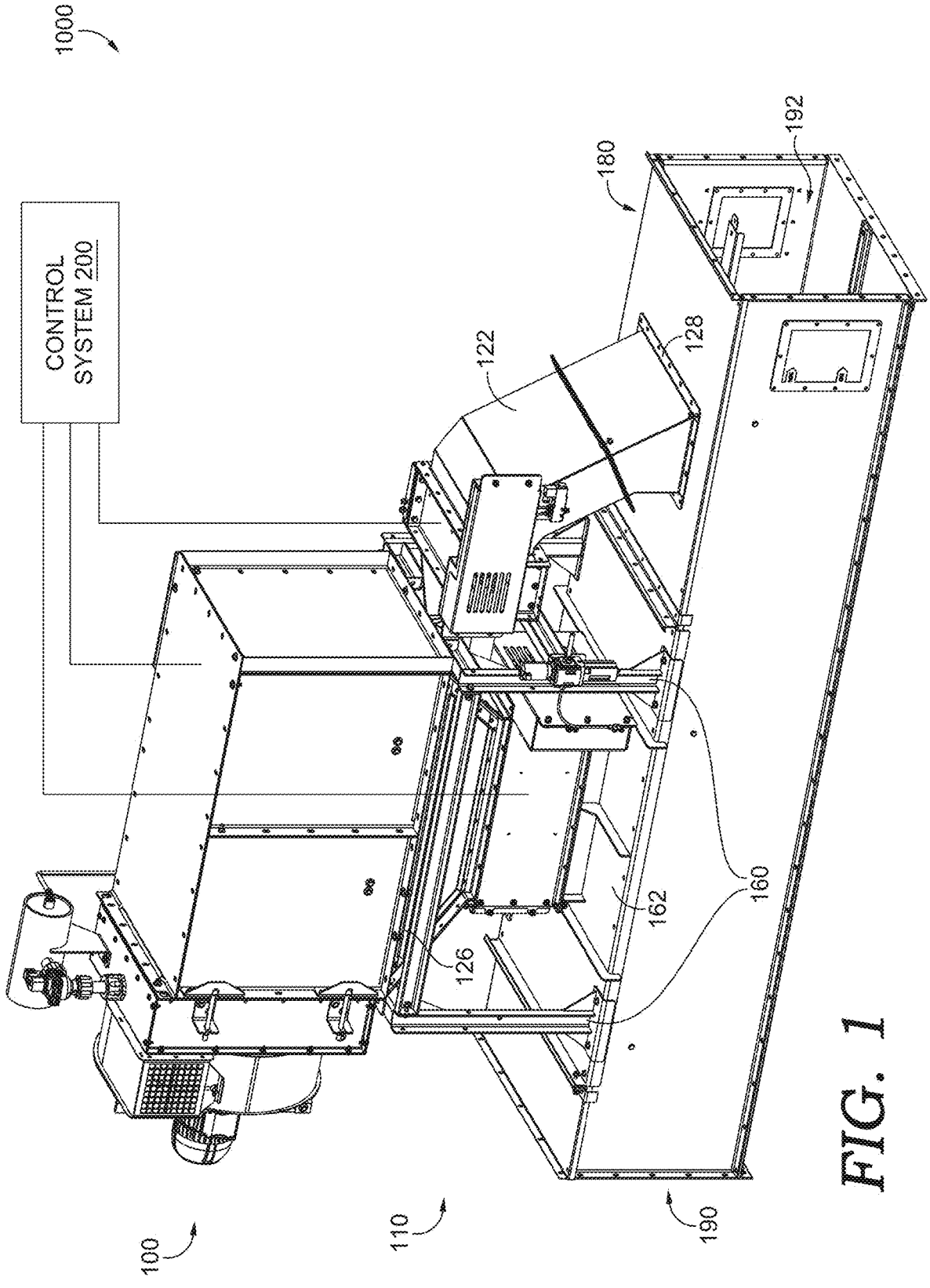
FIG. 1 depicts an isometric view of a complete dust control system assembly, illustrating the integration of components for comprehensive dust management in industrial applications.

The subject matter of embodiments of the present invention is described with specificity herein to meet statutory requirements. However, the description itself is not intended to limit the scope of this patent. Rather, the inventor(s) have contemplated that the claimed subject matter might also be embodied in other ways, to include different features or combinations of features similar to the ones described in this document, in conjunction with other present or future technologies. Further, it should be appreciated that the figures do not necessarily represent an all-inclusive representation of the embodiments herein and may have various components hidden to aid in the written description thereof.

Industrial material handling systems commonly employ spot dust filters to control airborne particulates generated during material transport and processing operations. These filtration devices operate by creating negative pressure within equipment housings to capture dust particles through filter elements. During normal operation, spot dust filters maintain continuous suction to prevent dust emissions from escaping into the surrounding environment. The filtration process becomes compromised when accumulated dust particles clog the filter elements, reducing airflow efficiency and filtration performance.

Spot dust filters address filter element clogging through periodic cleaning cycles that utilize compressed air pulses to dislodge accumulated dust particles. The cleaning process involves reversing airflow direction momentarily to blow accumulated dust off filter surfaces back into the equipment system. While this regeneration process restores filter functionality, the compressed air pulse creates temporary positive pressure within the equipment housing. In applications where equipment systems have imperfect sealing, this positive pressure pulse may cause fugitive dust emissions to escape through joints, connections, and other potential leak points in the equipment structure.

The challenge of controlling fugitive dust emissions becomes particularly pronounced in food-grade facilities, pharmaceutical manufacturing environments, and other applications where stringent cleanliness standards apply. In such environments, even minimal dust emissions during filter cleaning cycles may violate operational requirements and regulatory standards. Traditional solutions for addressing this challenge include implementing central dust collection systems or upgrading to hermetically sealed conveyor designs. However, these approaches often involve substantial capital expenditure and extensive facility modifications.

Alternative approaches to managing dust emissions during spot filter cleaning cycles focus on isolating the cleaning pulse from the equipment environment while maintaining the dust collection functionality. Such systems may incorporate valve mechanisms to temporarily disconnect the spot filter from the equipment during cleaning operations. The collected dust particles may then be transferred back to the equipment through controlled discharge mechanisms that prevent pressure pulses from affecting the equipment environment. These approaches may provide dust emission control while preserving the operational benefits and cost-effectiveness of spot dust filtration systems.

Control systems for managing valve operations during cleaning cycles may utilize relay-based circuits, programmable logic controllers, or microcontroller-based systems to coordinate timing sequences. The control approach may involve intercepting cleaning signals from spot dust filters and implementing predetermined valve operation sequences to isolate cleaning pulses while facilitating controlled dust discharge. The control system may be specifically configured with signal interception circuitry that monitors electrical connections to the spot dust filter for cleaning signal generation, utilizing voltage detection circuits, current sensing mechanisms, or digital signal processing to identify when cleaning cycles are initiated. Signal processing algorithms within the control system may analyze cleaning signal characteristics including signal amplitude, duration, frequency, and timing patterns to distinguish cleaning signals from other operational signals and prevent false triggering of valve sequences. The control system may incorporate signal conditioning circuits that amplify, filter, and digitize cleaning signals to ensure reliable detection across varying environmental conditions and electrical noise levels encountered in industrial applications. The control system may coordinate cleaning pulse containment within the plenum through valve isolation sequencing that ensures the first valve is fully closed before releasing the cleaning signal, creating a sealed containment volume bounded by the closed first valve, the plenum walls, and the closed second valve. The plenum containment system may incorporate pressure monitoring circuits that verify containment integrity before cleaning pulse initiation, ensuring that all isolation valves are properly positioned and sealed to prevent cleaning pulse escape. The control system may implement cleaning pulse timing control that coordinates the duration and intensity of cleaning pulses with the plenum's expansion capabilities, preventing over-pressurization while ensuring effective dust dislodgement from filter elements. Timing parameters for valve operations may be adjustable to accommodate different dust characteristics, equipment configurations, and operational requirements across various industrial applications.

Referring to FIG. 1, an isometric view of complete dust control system assembly 1000 illustrates the overall configuration and integration of components within a dust filtration system. A spot dust filter 100 may be positioned at the upper portion of the assembly to provide primary dust collection functionality for material handling operations. The spot dust filter 100 may incorporate standard filtration elements and cleaning mechanisms commonly employed in industrial equipment applications. A dust control system 110 may be positioned between the spot dust filter 100 and a conveyor housing 180, by way of non-limiting example, to provide controlled dust management during filter cleaning operations. The dust control system 110 may define a housing positioned between the spot dust filter 100 and the conveyor housing 180, with the housing defining an internal chamber for containing and managing dust particles during cleaning cycles.

The dust control system 110 may incorporate an inlet/vacuum duct 122 that establishes fluid communication between the spot dust filter 100 and the conveyor housing 180 during normal filtration operations. The inlet/vacuum duct 122 may provide a conduit for airflow and dust particle transport from the conveyor environment to the filtration elements within the spot dust filter 100. Connection interfaces between system components may include an upper connection flange 126 and a lower connection flange 128 that facilitate secure mounting and sealing between the dust control system 110, spot dust filter 100, and conveyor housing 180. The upper connection flange 126 may provide a standardized interface for attachment to various spot dust filter configurations, while the lower connection flange 128 may accommodate different equipment housing designs and mounting requirements.

The conveyor housing 180 may incorporate a conveyor inlet opening 190 and a conveyor outlet opening 192 to facilitate material flow through the conveyor system during normal operations. Material transport through the conveyor housing 180 may generate dust particles that require collection and management through the integrated filtration system. Mounting bracket(s) 160 may provide structural support for the assembly components, with the mounting brackets 160 forming or supporting a mounting plate 162 that creates a sealed interface between the dust control system 110 and the top surface of the conveyor housing 180. The mounting plate 162 may sit on top of the conveyor lid 186 and facilitate installation on existing conveyor systems or new installations by distributing the weight of the dust control system 110 across the conveyor top surface. The mounting bracket(s) 160 may accommodate different mounting configurations and provide adjustable positioning to align with various conveyor designs and facility requirements, while the mounting plate 162 may incorporate sealing features that maintain dust containment during operation.

A control system 200 may be connected to the dust control system 110 to manage operational sequences and coordinate valve operations during cleaning cycles. The control system 200 may be configured to intercept a cleaning signal from the spot dust filter 100 and coordinate operation of valves within the dust control system 110 to isolate cleaning pulses from the equipment while allowing collected dust to be discharged into the equipment through controlled mechanisms. The control system 200 may incorporate signal interception hardware including electrical interface circuits, signal isolation transformers, and input conditioning modules that monitor control signals from the spot dust filter 100 without interfering with normal filter operation. The control system 200 may utilize programmable timing sequences that coordinate valve operations through predetermined algorithms, with timing parameters stored in non-volatile memory and adjustable through user interfaces or remote programming capabilities. Valve coordination protocols within the control system 200 may ensure sequential operation of the first valve, second valve, and third valve through interlocking logic circuits that prevent simultaneous valve operations and maintain system isolation during cleaning cycles. The control system 200 may incorporate feedback monitoring circuits that verify valve positioning through position sensors, pressure sensors, or electrical feedback signals to confirm proper valve operation and detect system malfunctions. The dust control system 110 may incorporate a plenum within the housing configured to accommodate pressure changes during cleaning operations, along with valve arrangements that control airflow and dust discharge processes.

In some cases, the dust control system 110 may be designed as a retrofit kit for existing spot filter installations, allowing facilities to upgrade existing filtration systems without complete replacement of spot dust filter 100 components. Retrofit configurations may incorporate universal mounting interfaces that accommodate different spot filter manufacturers and equipment types, providing compatibility across various industrial applications. In some cases, the dust control system 110 may be designed as an integrated unit manufactured together with the spot dust filter 100, creating a unified assembly that incorporates both filtration and dust control functionality within a single system package. Integrated designs may provide enhanced sealing performance and simplified installation procedures compared to separate component configurations. The mounting plate 162 may be configured to sit directly on the top surface of existing conveyor housings 180, enabling retrofit installation without structural modification to existing conveyor systems. The mounting plate 162 may provide a standardized interface that accommodates different conveyor widths and configurations while maintaining proper sealing between the dust control system 110 and the conveyor environment. The mounting plate 162 may incorporate quick-disconnect features that facilitate removal of the dust control system 110 for maintenance operations while preserving the sealed interface when reinstalled.

Modular designs may allow the dust control system 110 to be configured in different sizes and configurations to match various equipment widths and dust loads encountered in different industrial applications. Modular approaches may incorporate interchangeable housing sections, valve assemblies, and control components that may be selected based on specific operational requirements and equipment system characteristics. The dust control system 110 may include quick-disconnect fittings for easier maintenance and installation procedures, reducing downtime during service operations and facilitating component replacement or system modifications. The mounting plate 162 may incorporate quick-disconnect interfaces that enable rapid removal and reinstallation of the dust control system 110 from the conveyor housing 180 without disturbing the sealed interface or requiring recalibration of the mounting alignment. The mounting plate 162 may incorporate quick-disconnect interfaces that enable rapid removal and reinstallation of the dust control system 110 from the conveyor housing 180 without disturbing the sealed interface or requiring recalibration of the mounting alignment. Quick-disconnect interfaces may be incorporated at connection points between the dust control system 110, spot dust filter 100, and conveyor housing 180 to enable rapid assembly and disassembly during maintenance activities.

The assembly configuration shown in FIG. 1 demonstrates how the dust control system 110 may be integrated between existing spot dust filter 100 and conveyor housing 180 components to provide enhanced dust emission control during filter cleaning operations. The dust control system 110 may incorporate a first valve positioned to control airflow between the spot dust filter 100 and the conveyor housing 180, along with a second valve and a third valve arranged in series to form an airlock mechanism for controlling dust discharge into the conveyor housing 180. The airlock mechanism may provide controlled dust transfer while maintaining isolation between cleaning pulse operations and the equipment environment, addressing dust emission concerns in applications where stringent cleanliness standards apply.

Figure 2:
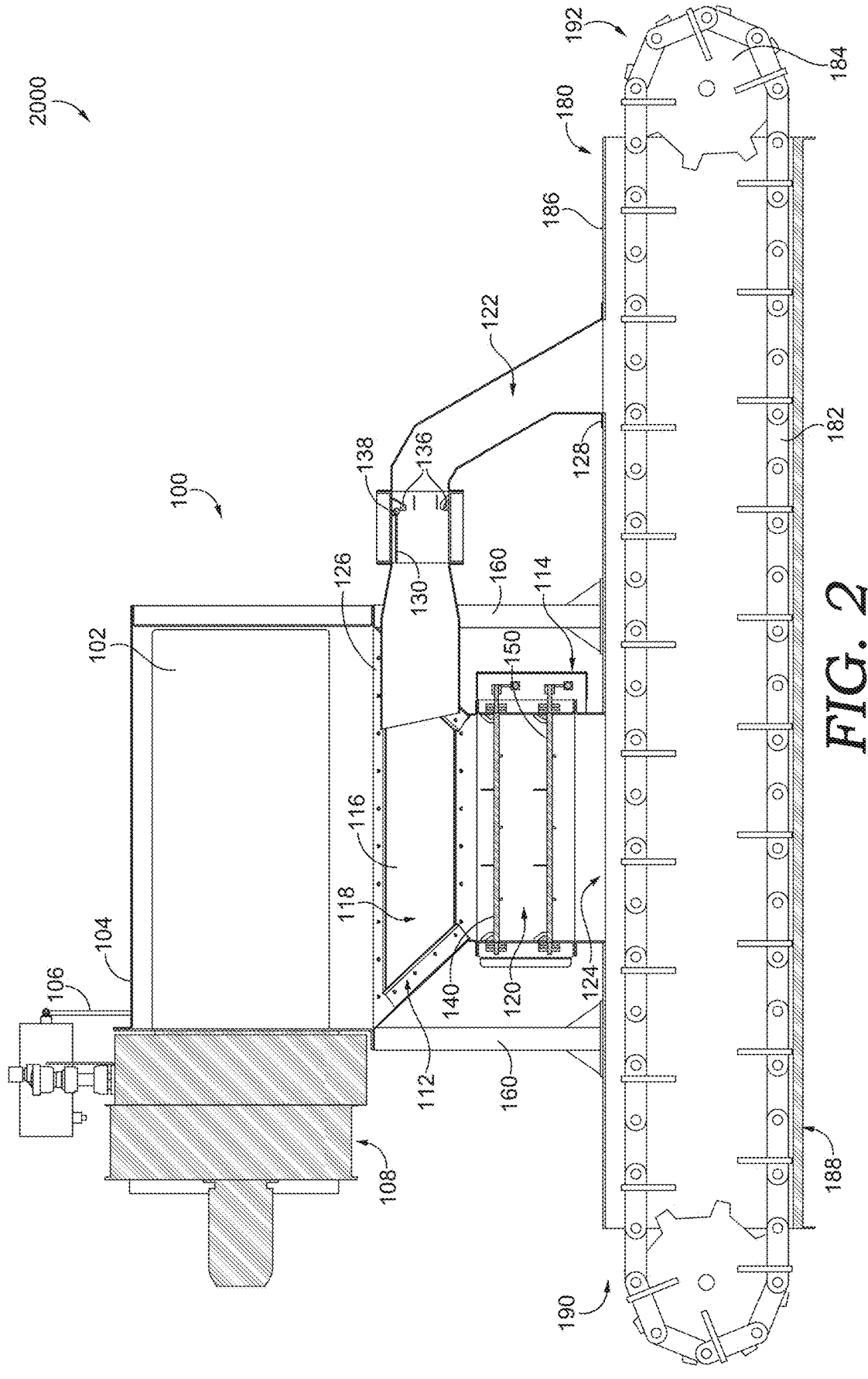
FIG. 2 illustrates a cross-sectional side view of the complete system showing internal components and airflow paths, demonstrating how the dust control mechanism operates within the overall assembly.

Referring to FIG. 2, a cross-sectional side view of the complete system showing internal components and airflow path 2000 illustrates the detailed construction and arrangement of components within the dust filtration assembly. The spot dust filter 100 may incorporate a filter element 102 contained within a spot filter housing 104 that provides structural support and environmental protection for the filtration components. A fan/blower 108 may be positioned at the upper portion of the spot dust filter 100 to generate the negative pressure typically required for dust collection operations during normal filtration cycles. A compressed air supply line 106 may connect to the spot dust filter 100 to provide the compressed air necessary for cleaning pulse operations that dislodge accumulated dust particles from the filter element 102 surfaces.

The dust control system 110 may incorporate an upper housing 112 and a lower housing 114 that together define the structural framework for containing and managing dust particles during cleaning operations. The upper housing 112 may incorporate plenum walls 116 that are elastomeric and form a plenum chamber 118 configured to accommodate pressure changes generated during spot dust filter cleaning cycles. The plenum walls 116 may be specifically configured with variable wall thickness, flexible membrane sections, and controlled expansion zones that enable controlled deformation in response to compressed air pulses from the spot dust filter cleaning cycle. The plenum walls 116 may expand in response to compressed air pulses from the spot dust filter cleaning cycle, allowing the plenum chamber 118 to absorb pressure variations while maintaining controlled airflow conditions through integrated pressure distribution channels and flow regulation features. The plenum walls 116 may incorporate pressure-responsive expansion joints, flexible bellows sections, and elastomeric diaphragm elements that provide controlled volumetric expansion capabilities ranging from normal operating volume to expanded cleaning pulse volume. The plenum walls 116 may contract to return to a normal operating configuration after cleaning pulse operations are completed, restoring the plenum chamber 118 to standard operational dimensions through inherent elastic recovery properties and structural return mechanisms.

The plenum walls 116 may be constructed from natural rubber materials that provide flexibility and durability for repeated expansion and contraction cycles during cleaning operations. The plenum walls 116 may incorporate reinforced fabric layers, embedded fiber reinforcement, and multi-durometer elastomeric compounds that provide enhanced pressure handling capabilities while maintaining flexible response characteristics. In some cases, the plenum walls 116 may be constructed from synthetic rubber compounds such as EPDM, nitrile, or silicone for specific operating temperatures and chemical resistance requirements encountered in different industrial applications. The plenum walls 116 may be constructed from thermoplastic elastomers as an alternative material option that provides enhanced chemical compatibility and temperature stability in specialized operating environments. The plenum walls 116 may incorporate modular construction with replaceable membrane sections, adjustable tension elements, and field-serviceable expansion components that enable maintenance and customization for different pressure handling requirements. The plenum walls 116 may be constructed from fabric-reinforced flexible materials for enhanced durability and resistance to mechanical stress during repeated pressure cycling operations, with integrated pressure relief features and controlled failure modes that prevent catastrophic over-pressurization.

The lower housing 114 may define an intermediate dust collection chamber 120 positioned below the plenum chamber 118 to receive and temporarily contain dust particles dislodged during cleaning operations. The intermediate dust collection chamber 120 may provide a staging area for collected dust particles before controlled discharge into the conveyor system through valve mechanisms. The intermediate dust collection chamber 120 may be specifically configured with geometric features that facilitate dust collection and retention, including funnel-shaped collection surfaces, sloped chamber walls, and dust accumulation hoppers that direct dislodged dust particles toward central collection zones through gravitational settling mechanisms. The chamber walls may incorporate dust-directing features such as collection baffles, flow guidance ribs, and particle separation elements that optimize dust capture efficiency while preventing dust re-entrainment during collection operations. The intermediate dust collection chamber 120 may include dust settling zones with reduced airflow velocity that promote gravitational settling of dust particles, along with particle agglomeration areas where fine dust particles may combine to form larger, more easily collected dust masses. The chamber design may incorporate dust retention features such as collection hoppers, accumulation wells, and temporary storage areas that contain collected dust particles until controlled discharge operations transfer the dust to the conveyor system. An outlet opening 124 may be positioned at the lower portion of the dust control system 110 to facilitate dust discharge into the conveyor housing 180 during normal operations and controlled dust transfer sequences. The outlet opening 124 may be sized and configured to accommodate the dust flow rates and particle characteristics encountered in different material handling applications, with opening geometry designed to prevent dust bridging while maintaining controlled discharge flow patterns.

With continued reference to FIG. 2, a first valve (VL1) 130 may be positioned in the inlet/vacuum duct 122 connecting the spot dust filter 100 to the conveyor housing 180 to control airflow between these components during cleaning operations. The first valve (VL1) 130 may be a pneumatically actuated valve that utilizes compressed air supplied to the spot dust filter 100 for valve operation, eliminating the need for separate pneumatic supply systems. The first valve (VL1) 130 may be normally open during standard filtration operations and configured to close upon receipt of the cleaning signal from the spot dust filter 100. A valve actuator 139 may be connected to the first valve (VL1) 130 to provide the mechanical force required for valve positioning during operational sequences. In some cases, pneumatic actuators may be replaced with electric motor-driven actuators for valve operation, eliminating the need for compressed air supply to the valves while maintaining precise timing control over valve positioning sequences.

A second valve (VL2) 140 and a third valve (VL3) 150 may be positioned below the plenum chamber 118 in series arrangement to form an airlock mechanism for controlling dust discharge into the conveyor housing 180. The second valve (VL2) 140 and third valve (VL3) 150 may be pneumatically actuated valves operated using compressed air supplied to the spot dust filter 100, providing consistent actuation force and eliminating the need for separate compressed air supply systems. The second valve (VL2) 140 may be normally closed and positioned above the third valve (VL3) 150 to create a controlled dust transfer sequence that prevents direct communication between the plenum chamber 118 and the conveyor housing 180 during cleaning operations. In some cases, pneumatic actuators may be replaced with hydraulic actuators that provide higher force capabilities for larger valve sizes or higher pressure applications encountered in heavy-duty industrial conveyor systems. Pneumatic actuators may be replaced with electromagnetic solenoid-operated valves that offer faster response times for valve sequencing operations in applications requiring rapid cycling between cleaning and filtration modes.

The conveyor housing 180 may incorporate a conveyor body 188 that provides the structural framework for material transport operations and houses the mechanical components required for conveyor functionality. A conveyor chain 182 may be positioned within the conveyor body 188 to facilitate material movement through the conveyor system during normal operations. A drive sprocket 184 may engage with the conveyor chain 182 to provide the mechanical force required for material transport through the conveyor housing 180. A conveyor lid 186 may enclose the upper portion of the conveyor body 188 to contain transported materials and provide environmental protection for internal conveyor components. The conveyor lid 186 may incorporate sealing features that work in conjunction with the dust control system 110 to minimize fugitive dust emissions during both normal operations and cleaning cycles.

The plenum walls 116 may use multi-layer constructions combining different elastomeric materials to provide enhanced durability and pressure handling capabilities for demanding industrial applications. Multi-layer constructions may incorporate inner layers optimized for chemical resistance and outer layers designed for mechanical durability and environmental protection. The plenum walls 116 may incorporate graduated stiffness zones with varying elastomeric properties that provide controlled expansion characteristics, directing pressure-induced deformation to predetermined expansion areas while maintaining structural integrity in critical sealing regions. The plenum chamber 118 formed by the plenum walls 116 may accommodate compressed air from cleaning pulses while maintaining controlled pressure conditions that prevent excessive stress on system components through integrated pressure distribution manifolds, expansion chambers, and flow dampening elements. The plenum chamber 118 may incorporate internal baffle systems, pressure equalization channels, and turbulence reduction features that optimize pressure accommodation while minimizing stress concentrations on the plenum walls 116. The arrangement of the upper housing 112, lower housing 114, plenum chamber 118, and intermediate dust collection chamber 120 may provide a controlled environment for managing dust particles during cleaning operations while maintaining isolation between cleaning pulse operations and the conveyor environment through coordinated pressure management and controlled expansion capabilities.

Figure 3:
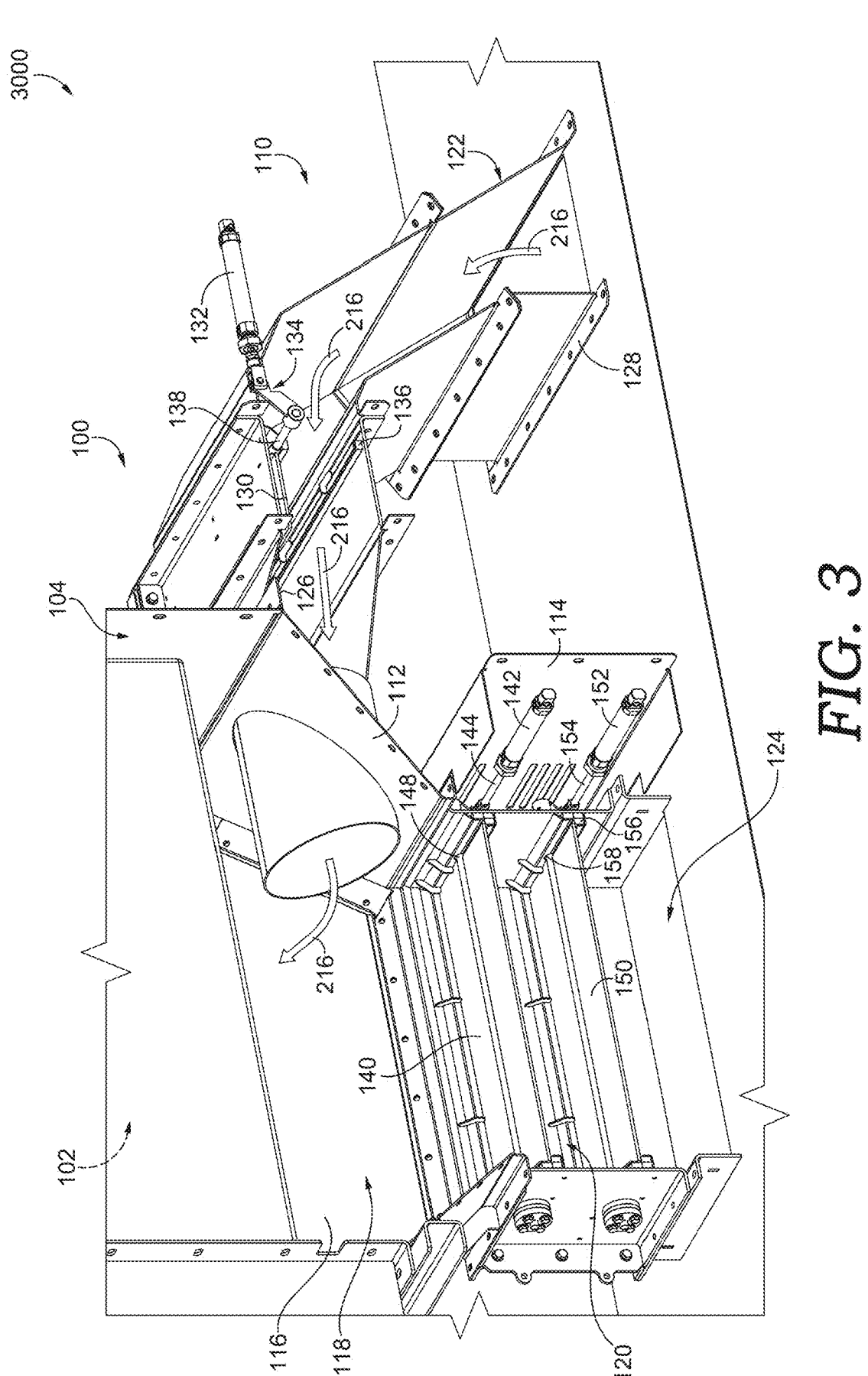
FIG. 3 illustrates a cross-sectional perspective view showing the dust control system installed between a spot filter and conveyor, highlighting the spatial relationships and valve arrangements that enable effective dust isolation and transfer.

Referring to FIG. 3, an overall system perspective view showing dust control system installed between spot filter and conveyor 3000 illustrates the spatial relationships and installation configuration of components within the integrated filtration assembly. The dust control system 110 may be positioned between the spot dust filter 100 and the conveyor housing 180 to provide controlled dust management during filter cleaning operations. The upper housing 112 and lower housing 114 may define the structural framework that contains the plenum chamber 118 and intermediate dust collection chamber 120 within the dust control system 110. The plenum walls 116 may form the plenum chamber 118 and provide expansion capability to accommodate pressure variations during cleaning pulse operations. The inlet/vacuum duct 122 may establish fluid communication between the spot dust filter 100 and the conveyor housing 180, with the upper connection flange 126 and lower connection flange 128 providing secure mounting interfaces between system components.

The first valve (VL1) 130 may be positioned within the inlet/vacuum duct 122 to control airflow between the spot dust filter 100 and the conveyor housing 180 during cleaning operations. A pneumatic actuator (for VL1) 132 may be connected to the first valve (VL1) 130 to provide the mechanical force required for valve positioning during operational sequences. Valve linkage(s)/connecting rod(s) (for VL1) 134 may mechanically couple the pneumatic actuator (for VL1) 132 to the first valve (VL1) 130, transmitting actuator motion to valve positioning mechanisms. The first valve (VL1) 130 may incorporate valve seal(s)/gasket(s) (for VL1) 136 that provide airtight sealing when the first valve (VL1) 130 is in the closed position during cleaning pulse operations. Valve pivot point(s)/hinge(s) (for VL1) 138 may define the rotational axis for the first valve (VL1) 130, allowing controlled movement between open and closed positions in response to pneumatic actuator (for VL1) 132 operation.

The second valve (VL2) 140 may be positioned below the plenum chamber 118 within the dust control system 110 to control dust transfer from the plenum chamber 118 to the intermediate dust collection chamber 120. A pneumatic actuator (for VL2) 142 may be connected to the second valve (VL2) 140 to provide actuation force for valve operation during dust transfer sequences. Valve linkage(s)/connecting rod(s) (for VL2) 144 may mechanically connect the pneumatic actuator (for VL2) 142 to the second valve (VL2) 140, enabling controlled valve positioning in response to compressed air supply variations. The pneumatic actuator (for VL2) 142 may utilize compressed air supplied to the spot dust filter 100 for valve operation, eliminating the need for separate pneumatic supply systems and simplifying installation requirements. The valve linkage(s)/connecting rod(s) (for VL2) 144 may incorporate mechanical connections that translate linear actuator motion into rotational valve movement, providing controlled opening and closing sequences during dust transfer operations.

The third valve (VL3) 150 may be positioned below the intermediate dust collection chamber 120 to control dust discharge from the dust control system 110 into the conveyor housing 180. A pneumatic actuator (for VL3) 152 may be connected to the third valve (VL3) 150 to provide the mechanical force required for valve operation during dust discharge sequences. Valve linkage(s)/connecting rod(s) (for VL3) 154 may mechanically couple the pneumatic actuator (for VL3) 152 to the third valve (VL3) 150, transmitting actuator motion to valve positioning mechanisms during operational cycles. The pneumatic actuator (for VL3) 152 may operate using compressed air supplied to the spot dust filter 100, providing consistent actuation force while maintaining system integration with existing compressed air infrastructure. The valve linkage(s)/connecting rod(s) (for VL3) 154 may incorporate adjustable connections that accommodate different valve opening requirements and provide precise control over dust discharge timing sequences.

With continued reference to FIG. 3, the spatial arrangement of the pneumatic actuator (for VL1) 132, pneumatic actuator (for VL2) 142, and pneumatic actuator (for VL3) 152 may provide coordinated valve operation while maintaining compact system dimensions suitable for installation between existing spot dust filter 100 and conveyor housing 180 components. The valve linkage(s)/connecting rod(s) (for VL1) 134, valve linkage(s)/connecting rod(s) (for VL2) 144, and valve linkage(s)/connecting rod(s) (for VL3) 154 may be positioned to avoid interference during valve operation while providing reliable mechanical connections between actuators and valve assemblies. During normal operation, airflow (normal operation) 216 may move through the inlet/vacuum duct 122 and first valve (VL1) 130 to transport dust particles from the conveyor housing 180 to the filter element 102 within the spot dust filter 100. The valve seal(s)/gasket(s) (for VL1) 136 may maintain airtight sealing during normal filtration operations while accommodating repeated opening and closing cycles during cleaning sequences.

The control system 200 may be configured to operate the first valve (VL1) 130, second valve (VL2) 140, and third valve (VL3) 150 in a sequence comprising closing the first valve (VL1) 130, releasing the cleaning pulse signal to the spot dust filter 100, opening the second valve (VL2) 140 after a first predetermined time delay, closing the second valve (VL2) 140 after a second predetermined time delay, and opening the third valve (VL3) 150 to discharge collected dust into the conveyor housing 180. The pneumatic actuator (for VL1) 132, pneumatic actuator (for VL2) 142, and pneumatic actuator (for VL3) 152 may each be operated by activating a solenoid valve to direct compressed air to the respective pneumatic actuator associated with each valve during operational sequences. The valve linkage(s)/connecting rod(s) (for VL1) 134, valve linkage(s)/connecting rod(s) (for VL2) 144, and valve linkage(s)/connecting rod(s) (for VL3) 154 may transmit actuator motion to valve positioning mechanisms with timing controlled by the control system 200 to maintain proper sequencing during cleaning and dust discharge operations.

In some cases, the first valve (VL1) 130, second valve (VL2) 140, and third valve (VL3) 150 may be replaced with butterfly valves instead of gate-style valves to provide different flow control characteristics and reduced pressure drop during normal filtration operations. The first valve (VL1) 130, second valve (VL2) 140, and third valve (VL3) 150 may be replaced with ball valves for different flow control characteristics that provide improved sealing performance and reduced maintenance requirements in demanding industrial applications. In some cases, the first valve (VL1) 130, second valve (VL2) 140, and third valve (VL3) 150 may be replaced with iris diaphragm valves for specialized flow control applications that require precise flow modulation and variable opening configurations. The first valve (VL1) 130, second valve (VL2) 140, and third valve (VL3) 150 may be replaced with sliding plate valves as an alternative valve configuration that provides linear motion actuation and simplified mechanical connections with the valve linkage(s)/connecting rod(s) (for VL1) 134, valve linkage(s)/connecting rod(s) (for VL2) 144, and valve linkage(s)/connecting rod(s) (for VL3) 154.

The valve openings within the first valve (VL1) 130, second valve (VL2) 140, and third valve (VL3) 150 may be circular, rectangular, or custom-shaped to optimize dust flow characteristics for different material types and particle size distributions encountered in various industrial applications. Multiple smaller valves may be used in parallel instead of single large valves to provide redundancy or improved flow control during dust transfer operations, with each valve incorporating separate pneumatic actuators and valve linkages for independent operation. The valve seal(s)/gasket(s) (for VL1) 136 may incorporate knife-edge seals for improved sealing performance that provides enhanced contact pressure and reduced leakage during valve closure operations. In some cases, the valve seal(s)/gasket(s) (for VL1) 136 may incorporate inflatable seals for enhanced sealing capabilities that provide adjustable contact pressure and improved sealing performance across varying operating conditions and valve wear patterns.

Figure 4:
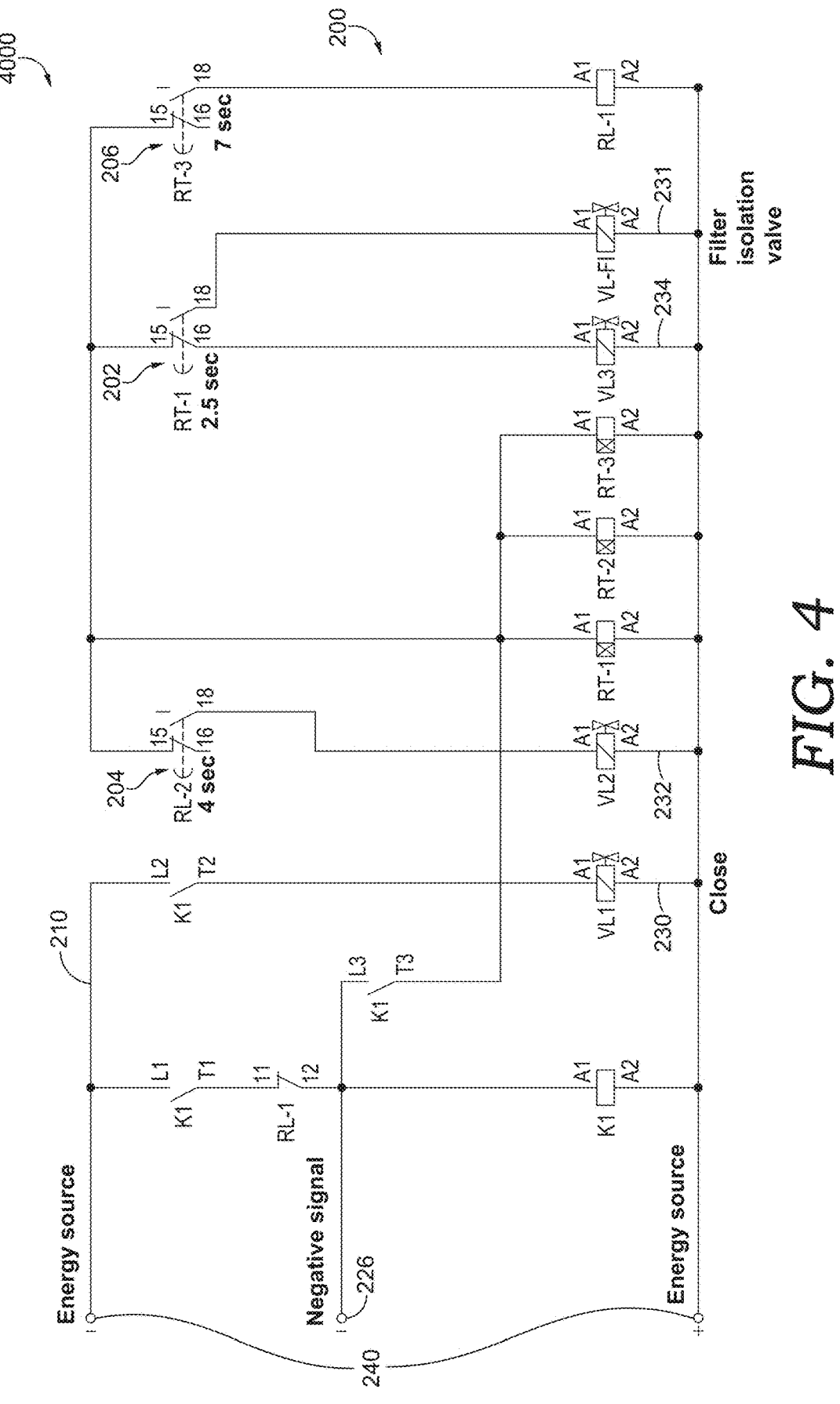
FIG. 4 illustrates an electrical control circuit diagram for the dust control system, showing how timer relays and control signals coordinate the sequential valve operations for improved dust management.

Referring to FIG. 4, a control system block diagram showing electrical connections and valve operation sequence 4000 illustrates the electrical control circuit configuration for coordinating valve operations during cleaning cycles. The control system 200 may incorporate electrical connections 210 that provide power distribution and signal transmission between control components and valve actuators throughout the dust control system 110. A control power supply 240 may provide electrical power to the control system 200 components, including relay circuits and timing elements that coordinate valve operation sequences during spot dust filter 100 cleaning cycles. The electrical connections 210 may distribute control signals and power to pneumatic valve actuators while maintaining electrical isolation between control circuits and high-pressure pneumatic systems.

A regeneration signal 226 may be generated by the spot dust filter 100 to indicate when cleaning pulse operations are initiated based on filter element 102 loading conditions or predetermined timing intervals. The regeneration signal 226 may be intercepted by the control system 200 to coordinate valve positioning sequences that isolate cleaning pulses from the conveyor housing 180 while facilitating controlled dust discharge operations. The control system 200 may incorporate signal interception mechanisms including electrical tap connections, inductive coupling devices, or optical isolation circuits that monitor the regeneration signal 226 without disrupting normal spot dust filter 100 operation. The control system 200 may utilize signal analysis algorithms that process the regeneration signal 226 characteristics including voltage levels, current patterns, pulse width, and signal timing to accurately identify cleaning cycle initiation and distinguish cleaning signals from other filter control signals. The control system 200 may incorporate a latching relay (RT-1) 202 configured to receive the cleaning signal from the spot dust filter 100 and coordinate subsequent valve operation sequences through relay contact K1 connections. The latching relay (RT-1) 202 may delay transmission of the cleaning pulse signal until the first valve (VL1) 130 is fully closed, preventing cleaning pulse pressure from affecting the conveyor housing 180 during filter regeneration operations. The latching relay (RT-1) 202 may incorporate electrical isolation features, contact debouncing circuits, and signal validation logic that ensure reliable operation under varying electrical conditions and prevent false triggering due to electrical noise or transient signals.

The control system 200 may incorporate a timer relay (RT-2) 204 configured to control timing sequences for valve operations during dust transfer and discharge cycles. The timer relay (RT-2) 204 may be adjustable to provide time delays between 3 seconds and 15 seconds for coordinating valve operations based on dust characteristics and system configuration requirements. The timer relay (RT-2) 204 may incorporate programmable timing circuits with digital counters, crystal oscillators, and precision timing references that provide accurate and repeatable timing sequences across varying environmental conditions. The timer relay (RT-2) 204 may utilize non-volatile memory storage for timing parameters, enabling custom timing profiles to be programmed and retained during power interruptions or system maintenance activities. A timer relay (RT-3) 206 may provide additional timing control for sequential operation of the second valve (VL2) 140 and third valve (VL3) 150 during dust discharge sequences. The timer relay (RT-3) 206 may provide time delays ranging from 3 seconds to 15 seconds for coordinating sequential operation of the second valve (VL2) 140 and third valve (VL3) 150 based on dust accumulation rates and conveyor system characteristics. The timer relay (RT-3) 206 may incorporate cascade timing logic that coordinates with the timer relay (RT-2) 204 to ensure proper sequencing and prevent valve operation conflicts during dust transfer operations. The latching relay (RT-1) 202 may be coupled to the timer relay (RT-2) 204 and timer relay (RT-3) 206 to provide adjustable time delays between valve operations while maintaining proper sequencing during cleaning and dust discharge cycles. The control system 200 may incorporate timing coordination algorithms that synchronize the latching relay (RT-1) 202, timer relay (RT-2) 204, and timer relay (RT-3) 206 operations through master timing control circuits, ensuring coordinated valve sequencing and preventing operational conflicts during cleaning cycles.

With continued reference to FIG. 4, the control system 200 may generate a first valve control signal (VL1) 230 that operates the first valve (VL1) 130 through the pneumatic actuator (for VL1) 132 during cleaning pulse isolation sequences. A second valve control signal (VL2) 232 may control the second valve (VL2) 140 through the pneumatic actuator (for VL2) 142 during dust transfer operations from the plenum chamber 118 to the intermediate dust collection chamber 120. A third valve control signal (VL3) 234 may operate the third valve (VL3) 150 through the pneumatic actuator (for VL3) 152 during dust discharge operations into the conveyor housing 180. A filter isolation valve control (VL-FI) 231 may coordinate with the first valve control signal (VL1) 230 to provide additional isolation control during cleaning pulse operations, with the control signal directed to the spot dust filter's internal pulse generation mechanism to ensure cleaning pulses occur only after proper system isolation is achieved.

The electrical connections 210 may incorporate a relay contact K1 that interfaces with control circuit components to coordinate valve actuation sequences based on the regeneration signal 226 from the spot dust filter 100. A first coil L1 may be energized through the relay contact K1 to activate control circuits associated with the first valve control signal (VL1) 230 and isolation (first) valve VL1 operation. A second coil L2 may be activated through relay contact K1 connections to generate the second valve control signal (VL2) 232 for intermediate (second) valve VL2 operation during dust transfer sequences. A third coil L3 may be energized through the relay contact K1 to produce the third valve control signal (VL3) 234 for discharge (third) valve VL3 operation during dust discharge cycles. The first coil L1, second coil L2, and third coil L3 may be connected to respective control terminals that distribute control signals to valve actuators while maintaining electrical isolation between control circuits and pneumatic systems.

The control system 200 may incorporate a first terminal T1 that provides electrical connection for the first coil L1 and first valve control signal (VL1) 230 distribution to the isolation (first) valve VL1 actuator systems. A second terminal T2 may provide electrical connection for the second coil L2 and second valve control signal (VL2) 232 distribution to the intermediate (second) valve VL2 actuator systems during dust transfer operations. A third terminal T3 may provide electrical connection for the third coil L3 and third valve control signal (VL3) 234 distribution to the discharge (third) valve VL3 actuator systems during dust discharge sequences. The first terminal T1, second terminal T2, and third terminal T3 may be configured to accommodate different electrical connection requirements and provide reliable signal transmission to valve actuators under varying environmental conditions encountered in industrial conveyor applications.

The control system 200 may incorporate a first relay RL-1 that coordinates with the latching relay (RT-1) 202 to provide controlled activation of the first coil L1 and first valve control signal (VL1) 230 generation during cleaning pulse isolation sequences. A second relay RL-2 may work in conjunction with the timer relay (RT-2) 204 to control activation of the second coil L2 and second valve control signal (VL2) 232 during dust transfer operations. The first relay RL-1 and second relay RL-2 may provide electrical isolation between control circuits and valve actuator systems while maintaining reliable signal transmission during repeated operational cycles. A first timer relay RT-1 may correspond to the latching relay (RT-1) 202 functionality, providing timing control for initial valve closure sequences during cleaning pulse operations. A second timer relay RT-2 may correspond to the timer relay (RT-2) 204 functionality, controlling timing sequences for dust transfer operations between the plenum chamber 118 and intermediate dust collection chamber 120. A third timer relay RT-3 may correspond to the timer relay (RT-3) 206 functionality, providing timing control for dust discharge operations from the intermediate dust collection chamber 120 into the conveyor housing 180.

The control system 200 may incorporate a filter valve VL-FI that works in conjunction with the filter isolation valve control (VL-FI) 231 to provide enhanced isolation control during cleaning pulse operations. The filter valve VL-FI may be positioned to provide additional isolation between the spot dust filter 100 and the dust control system 110 during cleaning cycles, enhancing system performance in applications where complete isolation is required during filter regeneration operations. The isolation (first) valve VL1 may correspond to the first valve (VL1) 130 functionality within the control system 200 electrical circuit configuration, providing controlled airflow isolation between the spot dust filter 100 and conveyor housing 180. The intermediate (second) valve VL2 may correspond to the second valve (VL2) 140 functionality within the electrical control circuit, controlling dust transfer from the plenum chamber 118 to the intermediate dust collection chamber 120 during cleaning sequences. The discharge (third) valve VL3 may correspond to the third valve (VL3) 150 functionality within the control system 200 configuration, providing controlled dust discharge from the intermediate dust collection chamber 120 into the conveyor housing 180.

In some cases, the control system 200 may be implemented using programmable logic controllers (PLCs) instead of relay-based systems for more sophisticated timing algorithms and remote monitoring capabilities that provide enhanced operational control and diagnostic functionality. The control system 200 may be implemented using microcontroller-based systems for fault detection and integration with plant-wide control systems, enabling advanced monitoring and automated response to system malfunctions or operational anomalies. The microcontroller-based systems may incorporate embedded software programs that execute valve coordination algorithms, process sensor feedback signals, and implement adaptive timing adjustments based on real-time operational conditions. The control system 200 may utilize programmable logic that stores valve operation sequences in memory, enabling custom operational profiles to be developed for different industrial applications and material handling requirements. In some cases, the control system 200 may be implemented using distributed control systems for advanced monitoring and control capabilities that provide centralized coordination of multiple dust control system 110 installations along extended conveyor lines. The distributed control systems may incorporate communication networks that enable data exchange between individual control systems 200, allowing coordinated operation and system-wide optimization of cleaning cycles and dust management operations. The timing sequences generated by the timer relay (RT-2) 204 and timer relay (RT-3) 206 may be made variable and programmable to accommodate different types of conveyed materials with varying dust characteristics, particle sizes, and accumulation rates encountered in diverse industrial applications. The programmable timing sequences may incorporate adaptive algorithms that automatically adjust timing parameters based on measured system performance, environmental conditions, and operational feedback from valve position sensors and pressure monitoring systems.

The control system 200 may store multiple timing profiles that may be selected based on the specific product being conveyed through the conveyor housing 180, allowing optimization of cleaning cycles and dust discharge sequences for different material handling operations. The dust control system 110 may operate in different modes such as continuous cycling, demand-based operation, or scheduled maintenance cycles based on control system 200 programming and operational requirements established for specific industrial applications. Variable pressure settings may be implemented within the control system 200 to optimize performance for different dust types and conveyor configurations, providing adaptive control that responds to changing operational conditions and material characteristics. The electrical connections 210, control power supply 240, and relay components within the control system 200 may be configured to accommodate different voltage requirements and environmental conditions encountered in various industrial installations while maintaining reliable operation during extended service periods.

Figure 5:
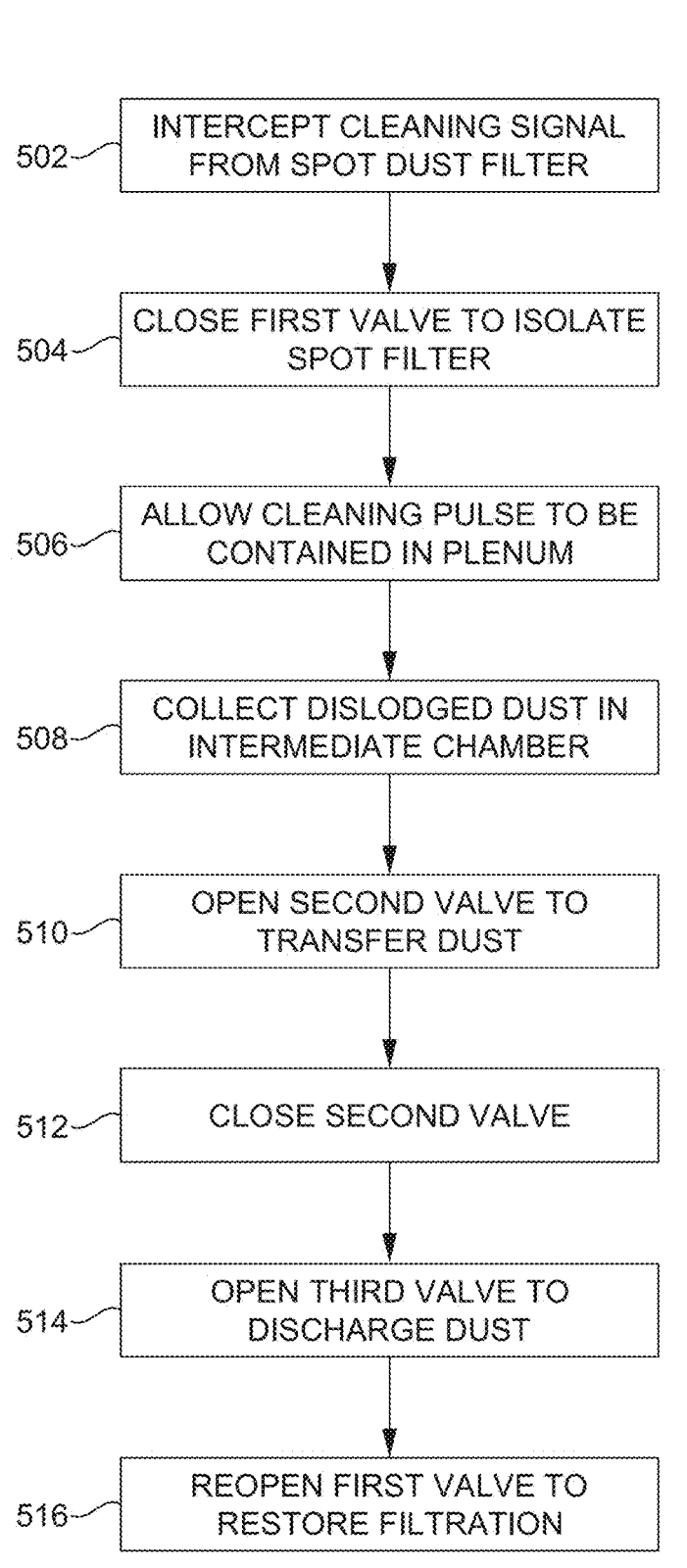
FIG. 5 illustrates a flowchart showing the operational sequence and timing, demonstrating the systematic approach to dust collection and discharge while maintaining system isolation during cleaning cycles.

Referring to FIG. 5, a flowchart showing operational sequence and timing 5000 illustrates the step-by-step operational sequence of the dust control system 110 from signal interception through valve coordination to dust discharge operations. The flowchart showing operational sequence and timing 5000 demonstrates the coordinated timing and sequencing of valve operations during cleaning cycles to maintain isolation between the spot dust filter 100 and the conveyor housing 180 while facilitating controlled dust discharge. The operational sequence may begin when the spot dust filter 100 generates the regeneration signal 226 based on filter element 102 loading conditions or predetermined timing intervals established for cleaning operations. The control system 200 may intercept the regeneration signal 226 to initiate the coordinated valve operation sequence that isolates cleaning pulses from the conveyor housing 180 while allowing collected dust to be discharged through controlled mechanisms.

A step 502 may represent the initial phase of the operational sequence where the control system 200 intercepts a cleaning signal generated by the spot dust filter 100 during filter regeneration operations. The step 502 may involve the latching relay (RT-1) 202 receiving the regeneration signal 226 from the spot dust filter 100 and initiating the coordinated valve operation sequence through the relay contact K1 and associated control circuits. During the step 502, the control system 200 may delay transmission of the cleaning pulse signal to the spot dust filter 100 until proper valve positioning is achieved to prevent cleaning pulse pressure from affecting the conveyor housing 180. The step 502 may establish the foundation for subsequent valve operations by intercepting the cleaning signal and preparing the dust control system 110 for cleaning pulse isolation and dust collection operations.

The operational sequence may continue to a step 504 where the control system 200 closes the first valve (VL1) 130 positioned between the spot dust filter 100 and the conveyor housing 180 in response to the cleaning signal received during the step 502. The step 504 may involve activating the first valve control signal (VL1) 230 through the first coil L1 and first terminal T1 to operate the pneumatic actuator (for VL1) 132 and position the first valve (VL1) 130 in the closed configuration. During the step 504, the valve linkage(s)/connecting rod(s) (for VL1) 134 may transmit actuator motion to the first valve (VL1) 130, while the valve seal(s)/gasket(s) (for VL1) 136 may provide airtight sealing to isolate the spot dust filter 100 from the conveyor housing 180. The step 504 may establish isolation between the spot dust filter 100 and the conveyor housing 180 to prevent cleaning pulse pressure from affecting the conveyor environment during filter regeneration operations.

With continued reference to FIG. 5, a step 506 may represent the phase where the control system 200 releases the cleaning signal to the spot dust filter 100 to generate a cleaning pulse that may be contained within the plenum chamber 118 formed by the plenum walls 116. The step 506 may occur after the first valve (VL1) 130 achieves full closure during the step 504, ensuring that cleaning pulse pressure may be isolated from the conveyor housing 180 during filter regeneration operations. The cleaning pulse containment process may be facilitated by the sealed containment volume created by the closed first valve (VL1) 130, the expandable plenum walls 116, and the closed second valve (VL2) 140, forming an isolated pressure chamber that prevents cleaning pulse escape. The plenum walls 116 may provide primary containment through their expansion capability, absorbing cleaning pulse pressure while maintaining structural integrity and preventing pressure transmission to surrounding equipment. During the step 506, the compressed air supply line 106 may deliver compressed air to the spot dust filter 100 to generate the cleaning pulse that dislodges accumulated dust particles from the filter element 102 surfaces. The plenum walls 116 may expand during the step 506 to accommodate the compressed air pulse while maintaining controlled pressure conditions within the plenum chamber 118, preventing excessive pressure buildup that could affect system components or compromise isolation performance. The cleaning pulse containment may be enhanced by sealing interfaces between the plenum chamber 118 and adjacent system components, including valve seals, gaskets, and connection flanges that prevent pressure leakage during cleaning operations. The containment system may incorporate pressure relief mechanisms that activate if cleaning pulse pressure exceeds safe operating limits, protecting system components while maintaining containment integrity during normal cleaning operations.

The operational sequence may proceed to a step 508 where dust dislodged by the cleaning pulse may be collected within the intermediate dust collection chamber 120 positioned below the plenum chamber 118 within the dust control system 110. The step 508 may involve gravitational settling of dust particles that have been dislodged from the filter element 102 during the cleaning pulse operation in the step 506. The dust collection process may be facilitated by the geometric configuration of the intermediate dust collection chamber 120, which may incorporate funnel-shaped walls, sloped surfaces, and collection hoppers that direct dust particles toward central collection areas through gravitational flow patterns. The intermediate dust collection chamber 120 may include dust directing baffles, flow guidance channels, and particle separation zones that optimize dust particle capture efficiency while preventing dust re-entrainment during collection operations. During the step 508, the dust particles may accumulate within the intermediate dust collection chamber 120 while the first valve (VL1) 130 remains closed to maintain isolation between the spot dust filter 100 and the conveyor housing 180. The dust collection mechanism may utilize controlled airflow patterns within the intermediate dust collection chamber 120 that create settling zones, reduce turbulence, and promote dust particle agglomeration to enhance collection effectiveness. The step 508 may provide temporary containment of collected dust particles before controlled transfer operations that discharge the dust into the conveyor housing 180 through sequential valve operations. The intermediate dust collection chamber 120 may accommodate varying dust accumulation volumes based on filter element 102 loading conditions and cleaning pulse effectiveness during different operational cycles, with chamber sizing designed to handle peak dust loads while maintaining effective collection performance.

A step 510 may represent the dust transfer phase where the control system 200 opens the second valve (VL2) 140 to transfer collected dust dislodged by the cleaning pulse from the plenum chamber 118 to the intermediate dust collection chamber 120 while the first valve (VL1) 130 remains closed to maintain isolation. The step 510 may involve activating the second valve control signal (VL2) 232 through the second coil L2 and second terminal T2 to operate the pneumatic actuator (for VL2) 142 and position the second valve (VL2) 140 in the open configuration. During the step 510, the valve linkage(s)/connecting rod(s) (for VL2) 144 may transmit actuator motion to the second valve (VL2) 140, allowing dust particles to transfer from the plenum chamber 118 through the intermediate dust collection chamber 120 toward the outlet opening 124. The timer relay (RT-2) 204 may control the timing of the step 510 to provide adjustable time delays between 3 seconds and 15 seconds for coordinating the dust transfer operation based on dust characteristics and system configuration requirements.

The operational sequence may continue to a step 512 where the control system 200 closes the second valve (VL2) 140 after the dust transfer operation is completed during the step 510. The step 512 may involve deactivating the second valve control signal (VL2) 232 to return the pneumatic actuator (for VL2) 142 to the closed position, isolating the intermediate dust collection chamber 120 from the lower portion of the dust control system 110. During the step 512, the second valve (VL2) 140 may achieve full closure to establish an airlock configuration that prevents direct communication between the intermediate dust collection chamber 120 and the conveyor housing 180 during subsequent dust discharge operations. The step 512 may be coordinated with the timer relay (RT-2) 204 to provide controlled timing between dust transfer completion and preparation for final dust discharge operations. The valve linkage(s)/connecting rod(s) (for VL2) 144 may transmit actuator motion to achieve proper valve closure while maintaining system isolation during the transition between dust transfer and discharge phases.

A step 514 may represent the dust discharge phase where the control system 200 opens the third valve (VL3) 150 to discharge the collected dust into the conveyor housing 180 while maintaining isolation between the spot dust filter 100 and the conveyor environment. The step 514 may involve activating the third valve control signal (VL3) 234 through the third coil L3 and third terminal T3 to operate the pneumatic actuator (for VL3) 152 and position the third valve (VL3) 150 in the open configuration. During the step 514, the valve linkage(s)/connecting rod(s) (for VL3) 154 may transmit actuator motion to the third valve (VL3) 150, allowing collected dust particles to discharge through the outlet opening 124 into the conveyor housing 180. The timer relay (RT-3) 206 may control the timing of the step 514 to provide time delays ranging from 3 seconds to 15 seconds for coordinating sequential operation of the third valve (VL3) 150 based on dust accumulation rates and conveyor system characteristics. The step 514 may complete the dust discharge operation while the first valve (VL1) 130 and second valve (VL2) 140 remain closed to maintain system isolation during dust transfer into the conveyor housing 180.

The operational sequence may conclude with a step 516 where the control system 200 closes the third valve (VL3) 150 and reopens the first valve (VL1) 130 to restore normal filtration operation after dust discharge operations are completed. The step 516 may involve deactivating the third valve control signal (VL3) 234 to return the pneumatic actuator (for VL3) 152 to the closed position, followed by reactivating the first valve control signal (VL1) 230 to return the first valve (VL1) 130 to the open configuration for normal filtration operations. During the step 516, the valve linkage(s)/connecting rod(s) (for VL1) 134 may transmit actuator motion to reopen the first valve (VL1) 130, reestablishing fluid communication between the spot dust filter 100 and the conveyor housing 180 through the inlet/vacuum duct 122. The step 516 may restore the airflow (normal operation) 216 through the dust control system 110, allowing the spot dust filter 100 to resume normal dust collection operations until the next cleaning cycle is initiated by the regeneration signal 226. The coordinated timing of valve operations during the step 516 may ensure that the dust control system 110 returns to normal operational configuration while maintaining proper isolation during the transition from cleaning mode to filtration mode.

The flowchart showing operational sequence and timing 5000 may demonstrate how the control system 200 coordinates the first valve (VL1) 130, second valve (VL2) 140, and third valve (VL3) 150 operations to sequentially operate the second valve (VL2) 140 and third valve (VL3) 150 in an airlock configuration to discharge the collected dust into the conveyor housing 180 while maintaining isolation between the spot dust filter 100 and the conveyor environment. The operational sequence may provide controlled dust management during filter cleaning operations while preventing cleaning pulse pressure from affecting the conveyor housing 180 and surrounding environment. The timing coordination between the step 502, step 504, step 506, step 508, step 510, step 512, step 514, and step 516 may ensure proper valve sequencing and dust transfer operations while maintaining system isolation and preventing fugitive dust emissions during cleaning cycles. The latching relay (RT-1) 202, timer relay (RT-2) 204, and timer relay (RT-3) 206 may provide adjustable timing control for each operational step to accommodate different dust characteristics, conveyor configurations, and operational requirements encountered in various industrial applications.

Figure 6A:
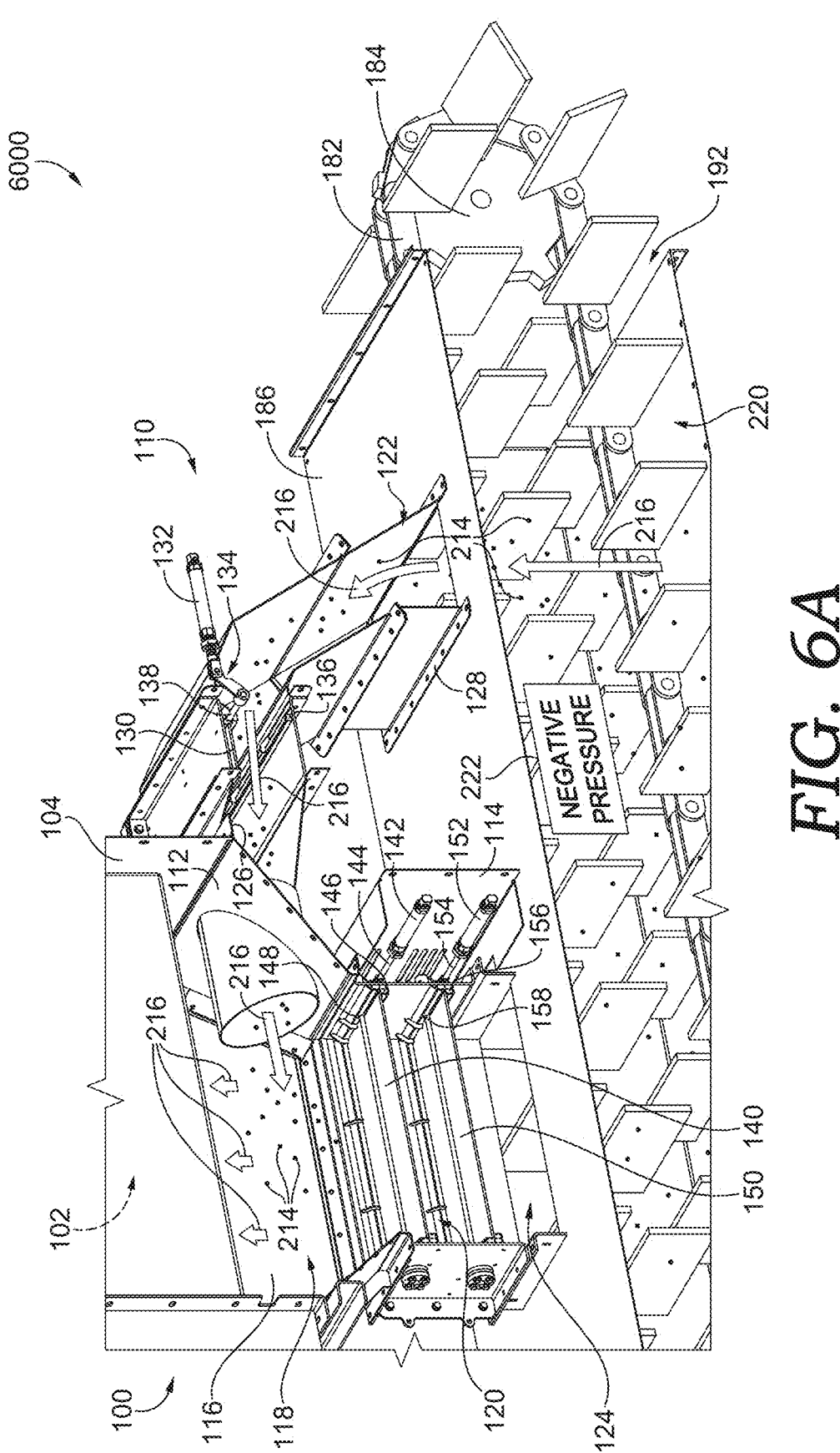
FIG. 6A illustrates a sectional view of the dust control system during normal operation state, showing how airflow and dust particles move through the system under standard filtration conditions.

Referring to FIG. 6A, a normal operation state (valves in filtration mode) 6000 illustrates the dust control system 110 during standard filtration operations when the spot dust filter 100 maintains continuous dust collection from the conveyor housing 180. During the normal operation state (valves in filtration mode) 6000, the first valve (VL1) 130 may be positioned in an open configuration to allow unrestricted airflow (normal operation) 216 through the inlet/vacuum duct 122 connecting the spot dust filter 100 to the conveyor housing 180. The pneumatic actuator (for VL1) 132 may maintain the first valve (VL1) 130 in the open position through the valve linkage(s)/connecting rod(s) (for VL1) 134, while the valve seal(s)/gasket(s) (for VL1) 136 may accommodate the open valve configuration without restricting airflow passage. The fan/blower 108 within the spot dust filter 100 may generate the suction force that creates airflow (normal operation) 216 through the dust control system 110 during normal filtration operations.

The airflow (normal operation) 216 may transport dust particles 214 from the conveyor housing 180 through the inlet/vacuum duct 122 and first valve (VL1) 130 toward the filter element 102 within the spot filter housing 104. The dust particles 214 may originate from material handling operations within the conveyor housing 180, where a product stream 220 moves along the conveyor chain 182 driven by the drive sprocket 184 during normal conveyor operations. The dust particles 214 may become airborne within the conveyor housing 180 due to material movement, mechanical agitation, or environmental factors that cause particulate matter to separate from the product stream 220. The conveyor inlet opening 190 and conveyor outlet opening 192 may facilitate material flow through the conveyor housing 180 while the dust particles 214 are simultaneously extracted through the dust control system 110 to prevent accumulation within the conveyor environment.

With continued reference to FIG. 6A, the spot dust filter 100 may maintain a negative pressure 222 within the conveyor housing 180 during the normal operation state (valves in filtration mode) 6000 to ensure continuous dust particle extraction and prevent fugitive emissions from escaping through joints or connections in the conveyor structure. The negative pressure 222 may be generated by the fan/blower 108 operating in conjunction with the filter element 102 to create suction conditions that draw the dust particles 214 and airflow (normal operation) 216 through the dust control system 110. The plenum walls 116 forming the plenum chamber 118 may remain in a contracted configuration during normal operations, providing minimal resistance to airflow (normal operation) 216 while maintaining structural integrity of the upper housing 112. The plenum chamber 118 may accommodate normal airflow variations without significant expansion during the normal operation state (valves in filtration mode) 6000, reserving expansion capability for cleaning pulse operations when compressed air pulses require pressure accommodation.

The second valve (VL2) 140 and third valve (VL3) 150 may remain in closed positions during the normal operation state (valves in filtration mode) 6000 to prevent airflow bypass through the intermediate dust collection chamber 120 and outlet opening 124. The pneumatic actuator (for VL2) 142 may maintain the second valve (VL2) 140 in the closed configuration through the valve linkage(s)/connecting rod(s) (for VL2) 144, while the pneumatic actuator (for VL3) 152 may similarly maintain the third valve (VL3) 150 in the closed position through the valve linkage(s)/connecting rod(s) (for VL3) 154. The closed positions of the second valve (VL2) 140 and third valve (VL3) 150 may ensure that the airflow (normal operation) 216 and dust particles 214 follow the intended path through the inlet/vacuum duct 122 and first valve (VL1) 130 toward the filter element 102, preventing airflow short-circuiting through alternative pathways within the dust control system 110. The intermediate dust collection chamber 120 may remain isolated from the airflow (normal operation) 216 during normal operations, providing a staging area that remains available for dust collection during subsequent cleaning cycles.

The product stream 220 may continue moving through the conveyor housing 180 along the conveyor chain 182 during normal filtration operations, with material transport occurring simultaneously with dust extraction through the dust control system 110. The conveyor lid 186 may enclose the upper portion of the conveyor housing 180 to contain the product stream 220 while allowing the negative pressure 222 to be maintained throughout the conveyor environment. The drive sprocket 184 may provide continuous mechanical force to move the conveyor chain 182 and associated product stream 220 through the conveyor inlet opening 190 and conveyor outlet opening 192 during normal material handling operations. The negative pressure 222 generated by the spot dust filter 100 may prevent dust particles 214 from escaping through potential leak points in the conveyor lid 186, conveyor body 188, or connection interfaces between conveyor sections, maintaining clean environmental conditions around the conveyor system. The upper connection flange 126 and lower connection flange 128 may provide sealed interfaces that maintain the negative pressure 222 within the conveyor housing 180 while allowing controlled airflow (normal operation) 216 through the dust control system 110 during normal filtration operations.

Figure 6B:
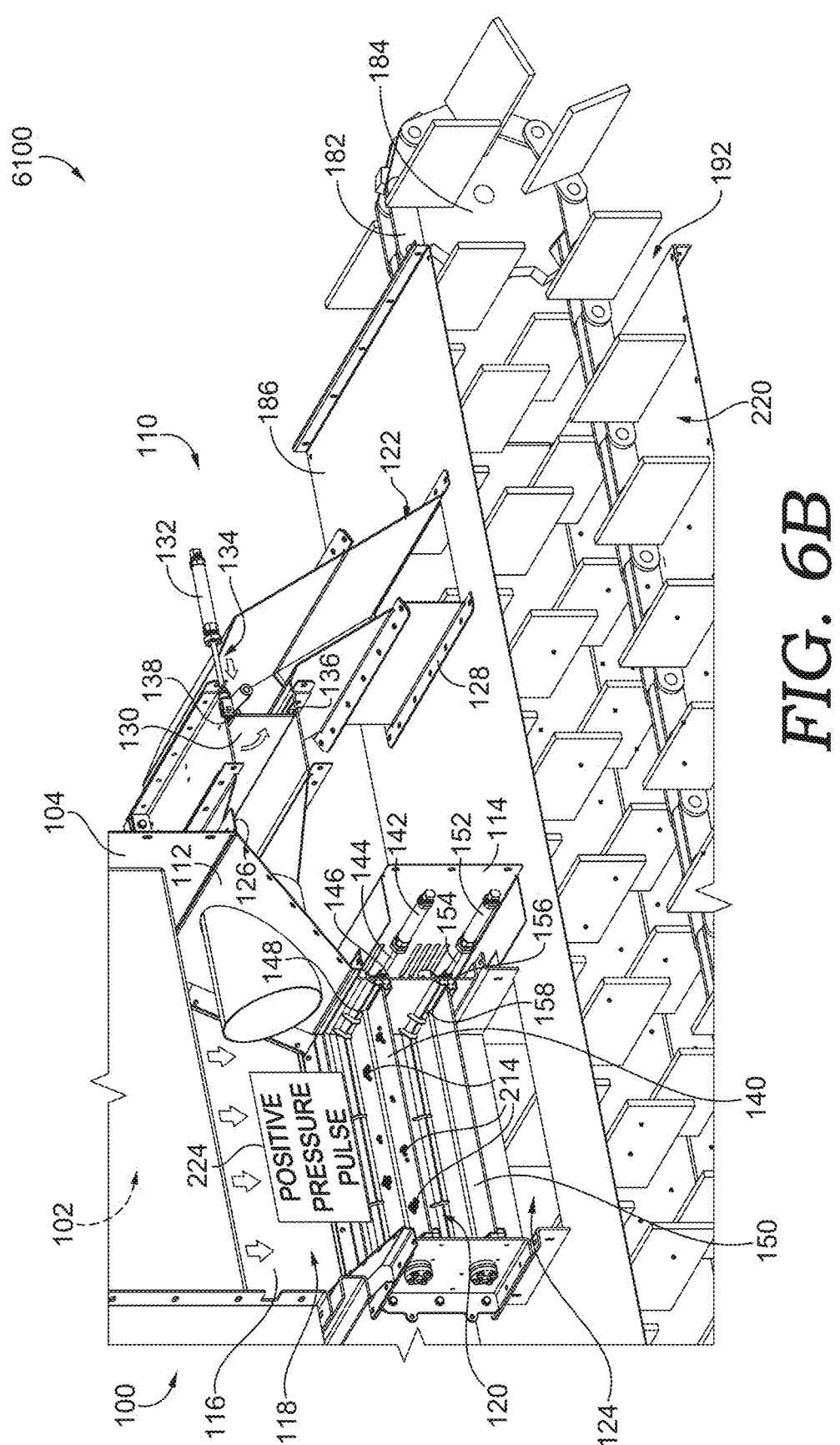
FIG. 6B illustrates a sectional view of the dust control system during cleaning pulse isolation state, demonstrating how the system contains and manages cleaning pulses to prevent dust re-entrainment.

Referring to FIG. 6B, a cleaning pulse isolation state (VL1 closed, pulse contained) 6100 illustrates the dust control system 110 configuration during cleaning pulse operations when the first valve (VL1) 130 may be positioned in a closed configuration to isolate the spot dust filter 100 from the conveyor housing 180. During the cleaning pulse isolation state (VL1 closed, pulse contained) 6100, the pneumatic actuator (for VL1) 132 may position the first valve (VL1) 130 in the closed configuration through the valve linkage(s)/connecting rod(s) (for VL1) 134, while the valve seal(s)/gasket(s) (for VL1) 136 may provide airtight sealing to prevent cleaning pulse pressure from affecting the conveyor housing 180. The spot dust filter 100 may generate a cleaning pulse airflow 218 through the compressed air supply line 106 to dislodge accumulated dust particles 214 from the filter element 102 surfaces during regeneration operations. The cleaning pulse airflow 218 may create a positive pressure pulse 224 within the plenum chamber 118 that may be contained and managed by the plenum walls 116 during cleaning operations.

The plenum walls 116 may expand in response to the positive pressure pulse 224 generated by the cleaning pulse airflow 218, accommodating pressure variations while maintaining controlled conditions within the plenum chamber 118. The expansion capability of the plenum walls 116 may be specifically configured through controlled wall geometry, predetermined expansion ratios, and engineered stress distribution patterns that prevent excessive pressure buildup that could compromise system components or affect the isolation performance between the spot dust filter 100 and the conveyor housing 180. The plenum walls 116 may incorporate pressure-activated expansion mechanisms, spring-loaded support elements, and controlled deformation zones that provide predictable expansion characteristics under varying cleaning pulse intensities. The cleaning pulse containment within the plenum chamber 118 may be achieved through multiple containment mechanisms working in coordination, including the sealed boundaries formed by the closed first valve (VL1) 130 and closed second valve (VL2) 140, the expandable plenum walls 116 that absorb pressure variations, and sealing interfaces that prevent pressure leakage to surrounding system components. The plenum chamber 118 may incorporate containment verification systems including pressure sensors that monitor internal pressure levels, expansion sensors that track plenum wall deformation, and leak detection systems that identify potential containment breaches during cleaning operations. During the cleaning pulse isolation state (VL1 closed, pulse contained) 6100, the plenum chamber 118 may function as a pressure accommodation chamber that absorbs the cleaning pulse airflow 218 while maintaining isolation from the conveyor environment through integrated pressure relief pathways, expansion volume calculations, and controlled pressure dissipation features. The plenum chamber 118 may incorporate pressure monitoring ports, expansion limit indicators, and safety relief mechanisms that prevent over-pressurization while optimizing cleaning pulse containment. The containment system may include redundant sealing features such as primary and secondary valve seals, backup pressure relief systems, and emergency containment protocols that maintain cleaning pulse isolation even during component failures or abnormal operating conditions. The upper housing 112 may provide structural support for the plenum walls 116 during expansion operations through reinforced mounting interfaces, distributed load transfer mechanisms, and controlled expansion guides, while the lower housing 114 may contain the intermediate dust collection chamber 120 that receives dust particles 214 dislodged during cleaning pulse operations. The positive pressure pulse 224 may be contained within the plenum chamber 118 without affecting the conveyor housing 180 or surrounding environment through coordinated pressure management systems, controlled expansion sequences, and integrated isolation mechanisms, preventing fugitive dust emissions during filter regeneration cycles.

With continued reference to FIG. 6B, the second valve (VL2) 140 and third valve (VL3) 150 may remain in closed positions during the cleaning pulse isolation state (VL1 closed, pulse contained) 6100 to maintain isolation between the plenum chamber 118 and the conveyor housing 180. The pneumatic actuator (for VL2) 142 may maintain the second valve (VL2) 140 in the closed configuration through the valve linkage(s)/connecting rod(s) (for VL2) 144, while the pneumatic actuator (for VL3) 152 may similarly maintain the third valve (VL3) 150 in the closed position through the valve linkage(s)/connecting rod(s) (for VL3) 154. A valve linkage 141 may provide mechanical connection between the pneumatic actuator (for VL2) 142 and the second valve (VL2) 140 to ensure proper valve positioning during cleaning pulse operations. The closed positions of the second valve (VL2) 140 and third valve (VL3) 150 may prevent the positive pressure pulse 224 from propagating through the dust control system 110 toward the conveyor housing 180, maintaining pressure isolation during cleaning operations.

The intermediate dust collection chamber 120 may receive dust particles 214 that settle from the plenum chamber 118 after being dislodged by the cleaning pulse airflow 218, providing temporary containment before subsequent dust transfer operations.

The cleaning pulse airflow 218 may reverse the normal airflow direction within the spot dust filter 100, creating turbulence that dislodges accumulated dust particles 214 from the filter element 102 surfaces and causes the dust particles 214 to fall into the plenum chamber 118. The positive pressure pulse 224 may create conditions that prevent dust re-entrainment by maintaining controlled pressure within the plenum chamber 118 while the plenum walls 116 accommodate pressure variations. The dust particles 214 may settle within the plenum chamber 118 and intermediate dust collection chamber 120 due to gravitational forces, while the positive pressure pulse 224 may dissipate through expansion of the plenum walls 116 rather than propagating toward the conveyor housing 180. The cleaning pulse isolation state (VL1 closed, pulse contained) 6100 may maintain separation between the cleaning pulse operations and the conveyor environment, preventing dust re-entrainment that could occur if the positive pressure pulse 224 were allowed to affect the conveyor housing 180 during filter regeneration cycles.

In some cases, additional intermediate chambers may be incorporated between the plenum chamber 118 and the third valve (VL3) 150 to provide multi-stage dust collection that enhances dust separation and containment during cleaning pulse operations. The additional intermediate chambers may provide sequential dust settling areas that allow larger dust particles 214 to separate from airflow before reaching final discharge mechanisms, improving dust collection efficiency during cleaning cycles. The intermediate dust collection chamber 120 may incorporate dust collection enhancement features such as cyclonic separation elements, inertial impaction surfaces, and gravitational settling zones that improve dust capture efficiency for different particle size distributions encountered in various industrial applications. Vibration systems may be added to the valve surfaces or chamber walls within the dust control system 110 to assist dust flow and prevent bridging of dust particles 214 during settling operations within the plenum chamber 118 and intermediate dust collection chamber 120. The vibration systems may provide mechanical agitation that prevents dust particles 214 from adhering to chamber surfaces or forming bridges that could impede dust flow during transfer operations, with vibration frequency and amplitude optimized for different dust characteristics and particle cohesion properties. Compressed air assist nozzles may be integrated within the plenum chamber 118 or intermediate dust collection chamber 120 to help move dust particles 214 through the valve sequences during subsequent dust transfer and discharge operations. The compressed air assist nozzles may provide directed airflow that facilitates dust particle movement and prevents accumulation in areas where gravitational settling may be insufficient for complete dust transfer, with nozzle positioning and air pressure designed to enhance dust collection without creating turbulence that could cause dust re-entrainment.

The intermediate dust collection chamber 120 may include level sensors that monitor dust accumulation and provide feedback to the control system 200 to optimize timing based on actual dust accumulation rates during cleaning cycles. The level sensors may detect when sufficient dust particles 214 have accumulated within the intermediate dust collection chamber 120 to warrant dust transfer operations, allowing the control system 200 to adjust timing sequences based on actual dust loading conditions rather than predetermined time intervals. The level sensors may provide input signals to the timer relay (RT-2) 204 and timer relay (RT-3) 206 to modify valve operation timing based on measured dust accumulation, optimizing dust transfer efficiency while maintaining proper isolation during cleaning pulse operations. The product stream 220 may continue moving through the conveyor housing 180 along the conveyor chain 182 during the cleaning pulse isolation state (VL1 closed, pulse contained) 6100, with material transport occurring independently of the cleaning pulse operations that may be isolated within the dust control system 110. The conveyor lid 186 may maintain containment of the product stream 220 while the cleaning pulse isolation state (VL1 closed, pulse contained) 6100 prevents cleaning pulse pressure from affecting the conveyor environment or causing fugitive dust emissions through potential leak points in the conveyor housing 180 structure.

Figure 6C:
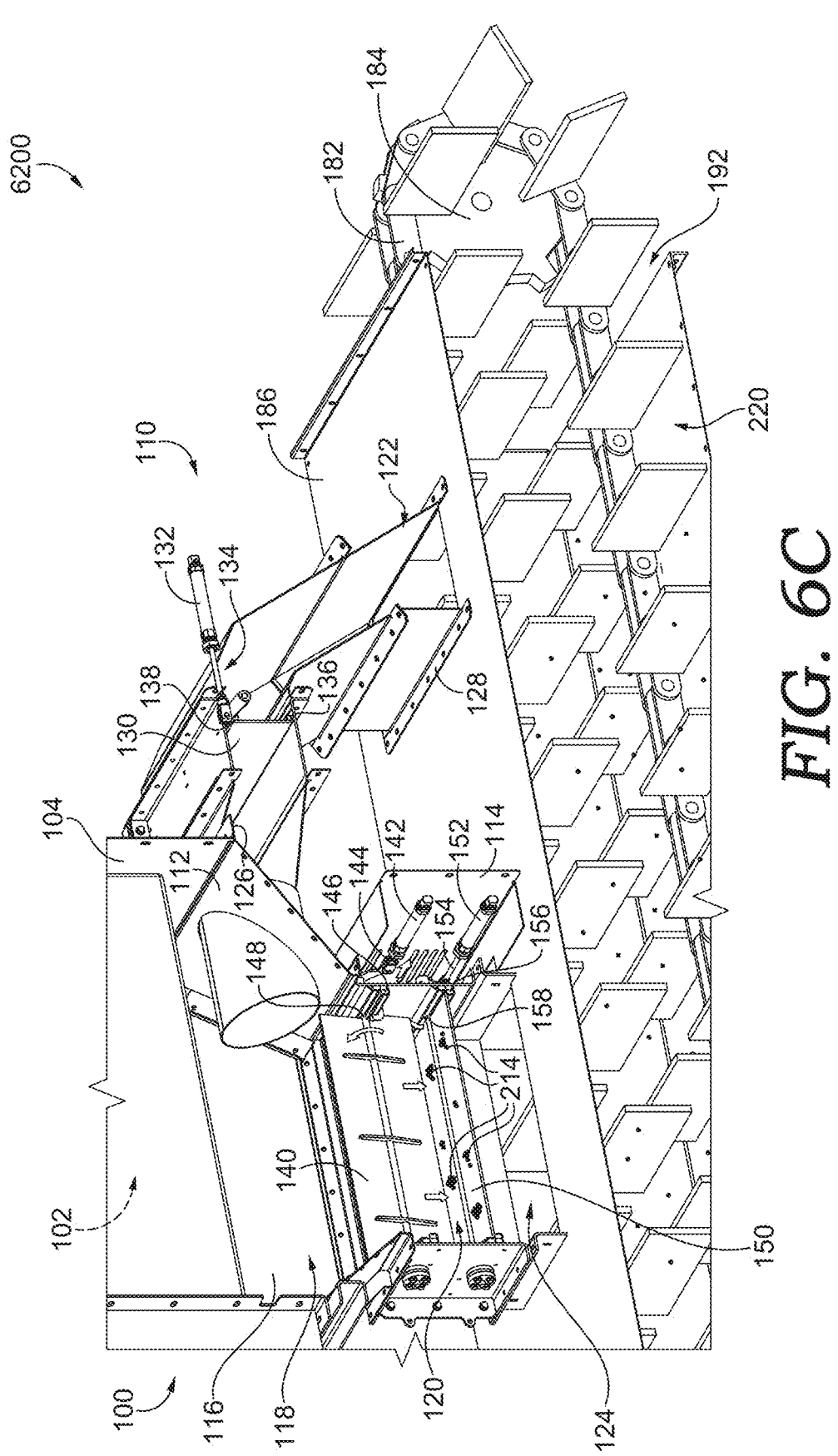
FIG. 6C illustrates a sectional view of the dust control system during first airlock operation, showing how dust is transferred from the plenum chamber to the intermediate collection chamber.

Referring to FIG. 6C, a first airlock operation (VL2 open, dust dropping to intermediate chamber) 6200 illustrates the dust control system 110 configuration during the initial phase of dust transfer operations following cleaning pulse containment within the plenum chamber 118. During the first airlock operation (VL2 open, dust dropping to intermediate chamber) 6200, the second valve (VL2) 140 may be positioned in an open configuration to allow controlled transfer of dust particles 214 from the plenum chamber 118 to the intermediate dust collection chamber 120 while maintaining isolation between the spot dust filter 100 and the conveyor housing 180. The pneumatic actuator (for VL2) 142 may operate the second valve (VL2) 140 through the valve linkage(s)/connecting rod(s) (for VL2) 144 in response to the second valve control signal (VL2) 232 generated by the control system 200 during the predetermined timing sequence established by the timer relay (RT-2) 204. The first valve (VL1) 130 may remain in the closed position during the first airlock operation (VL2 open, dust dropping to intermediate chamber) 6200 to prevent cleaning pulse pressure from affecting the conveyor housing 180 while dust transfer operations occur within the dust control system 110.

The dust particles 214 that were dislodged from the filter element 102 during the cleaning pulse airflow 218 operations may settle within the plenum chamber 118 and begin gravitational transfer through the opened second valve (VL2) 140 into the intermediate dust collection chamber 120. The dust collection process may be facilitated by the geometric configuration of the intermediate dust collection chamber 120, which may incorporate funnel-shaped collection surfaces, sloped chamber walls, and dust accumulation hoppers that direct dust particles toward central collection areas through gravitational flow patterns and controlled settling mechanisms. The intermediate dust collection chamber 120 may include dust directing baffles, flow guidance channels, and particle separation zones that optimize dust particle capture efficiency while preventing dust re-entrainment during the transfer sequence. The plenum walls 116 may contract from their expanded configuration as the positive pressure pulse 224 dissipates, allowing the plenum chamber 118 to return toward normal operational dimensions while facilitating dust particle movement through the opened second valve (VL2) 140. The dust particles 214 may flow through the second valve (VL2) 140 opening under gravitational influence, with particle movement facilitated by the pressure differential between the plenum chamber 118 and the intermediate dust collection chamber 120 during the dust transfer sequence. The dust collection mechanism may utilize controlled airflow patterns within the intermediate dust collection chamber 120 that create settling zones, reduce turbulence, and promote dust particle agglomeration to enhance collection effectiveness during the transfer operation. The intermediate dust collection chamber 120 may receive and temporarily contain the dust particles 214 during the first airlock operation (VL2 open, dust dropping to intermediate chamber) 6200, providing a staging area that isolates the transferred dust from both the plenum chamber 118 above and the conveyor housing 180 below through chamber design features that prevent dust migration and maintain controlled collection conditions.

With continued reference to FIG. 6C, the third valve (VL3) 150 may remain in the closed position during the first airlock operation (VL2 open, dust dropping to intermediate chamber) 6200 to maintain isolation between the intermediate dust collection chamber 120 and the conveyor housing 180. The pneumatic actuator (for VL3) 152 may maintain the third valve (VL3) 150 in the closed configuration through the valve linkage(s)/connecting rod(s) (for VL3) 154, preventing dust particles 214 from bypassing the intermediate dust collection chamber 120 and ensuring controlled dust transfer sequencing. The closed position of the third valve (VL3) 150 may create an airlock configuration where the intermediate dust collection chamber 120 functions as an isolated staging area that receives dust particles 214 from the plenum chamber 118 while preventing direct communication with the conveyor housing 180. The airlock configuration established by the opened second valve (VL2) 140 and closed third valve (VL3) 150 may provide controlled dust transfer that maintains system isolation and prevents cleaning pulse pressure from propagating toward the conveyor environment during dust collection operations.

The timer relay (RT-2) 204 may control the duration of the first airlock operation (VL2 open, dust dropping to intermediate chamber) 6200 by providing adjustable time delays between 3 seconds and 15 seconds for coordinating the dust transfer operation based on dust characteristics and system configuration requirements. The timing control provided by the timer relay (RT-2) 204 may ensure that sufficient time is allocated for complete dust particle transfer from the plenum chamber 118 to the intermediate dust collection chamber 120 while preventing excessive exposure time that could compromise system isolation performance. The control system 200 may monitor the first airlock operation (VL2 open, dust dropping to intermediate chamber) 6200 through the electrical connections 210 and second valve control signal (VL2) 232 to coordinate valve positioning with subsequent operational phases in the dust discharge sequence. The pneumatic actuator (for VL2) 142 may utilize compressed air supplied to the spot dust filter 100 for valve operation during the first airlock operation (VL2 open, dust dropping to intermediate chamber) 6200, maintaining system integration with existing compressed air infrastructure while providing reliable actuation force for dust transfer operations.

The product stream 220 may continue moving through the conveyor housing 180 along the conveyor chain 182 driven by the drive sprocket 184 during the first airlock operation (VL2 open, dust dropping to intermediate chamber) 6200, with material transport occurring independently of the dust transfer operations that remain isolated within the dust control system 110. The conveyor lid 186 may maintain containment of the product stream 220 while the first airlock operation (VL2 open, dust dropping to intermediate chamber) 6200 prevents dust particles 214 from affecting the conveyor environment during the controlled transfer sequence. The dust particles 214 may accumulate within the intermediate dust collection chamber 120 during the first airlock operation (VL2 open, dust dropping to intermediate chamber) 6200, with particle settling facilitated by gravitational forces and controlled airflow conditions established by the valve positioning sequence. The first airlock operation (VL2 open, dust dropping to intermediate chamber) 6200 may represent an intermediate phase in the overall dust discharge sequence that provides controlled dust transfer while maintaining isolation between cleaning pulse operations and the conveyor housing 180 environment, preparing the dust particles 214 for subsequent discharge operations through the third valve (VL3) 150 during later operational phases.

Figure 6D:
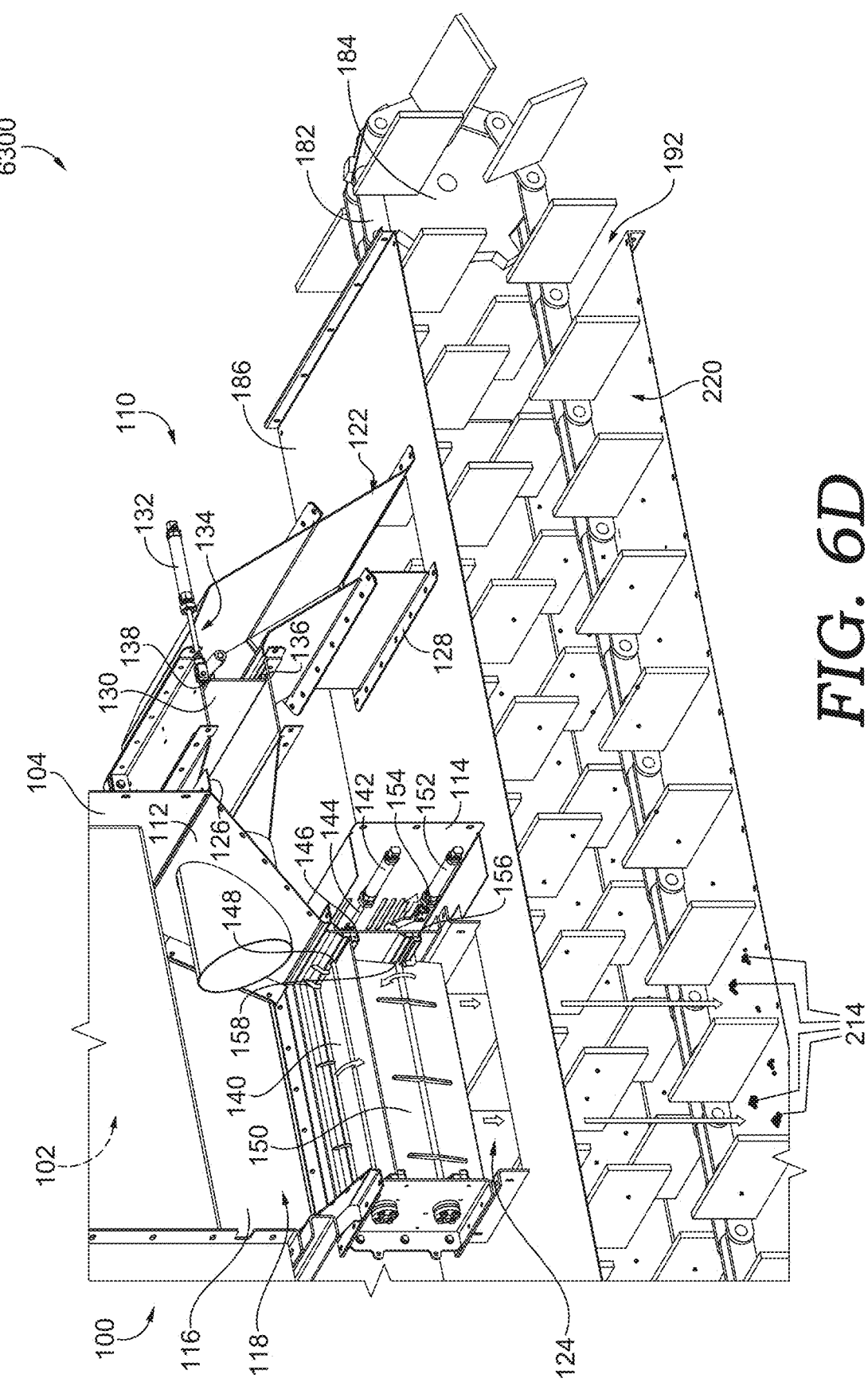
FIG. 6D illustrates a sectional view of the dust control system during second airlock operation, demonstrating how collected dust is discharged from the intermediate chamber into the product stream.

Referring to FIG. 6D, a second airlock operation (VL3 open, dust dropping to conveyor) 6300 illustrates the dust control system 110 configuration during the final phase of dust discharge operations where collected dust particles 214 may be transferred from the intermediate dust collection chamber 120 into the conveyor housing 180. During the second airlock operation (VL3 open, dust dropping to conveyor) 6300, the third valve (VL3) 150 may be positioned in an open configuration to allow controlled discharge of dust particles 214 from the intermediate dust collection chamber 120 through the outlet opening 124 into the product stream 220 within the conveyor housing 180. The pneumatic actuator (for VL3) 152 may operate the third valve (VL3) 150 through the valve linkage(s)/connecting rod(s) (for VL3) 154 in response to the third valve control signal (VL3) 234 generated by the control system 200 during the predetermined timing sequence established by the timer relay (RT-3) 206. The first valve (VL1) 130 may remain in the closed position during the second airlock operation (VL3 open, dust dropping to conveyor) 6300 to maintain isolation between the spot dust filter 100 and the conveyor housing 180 while dust discharge operations occur through the controlled airlock mechanism. The second valve (VL2) 140 may be positioned in the closed configuration during the second airlock operation (VL3 open, dust dropping to conveyor) 6300 to isolate the intermediate dust collection chamber 120 from the plenum chamber 118, creating an airlock configuration that prevents direct communication between the upper portions of the dust control system 110 and the conveyor housing 180 during dust discharge operations.

The dust particles 214 that accumulated within the intermediate dust collection chamber 120 during previous dust transfer operations may flow through the opened third valve (VL3) 150 under gravitational influence, with particle movement facilitated by the pressure differential between the intermediate dust collection chamber 120 and the conveyor housing 180 during the discharge sequence. The pneumatic actuator (for VL3) 152 may utilize compressed air supplied to the spot dust filter 100 for valve operation during the second airlock operation (VL3 open, dust dropping to conveyor) 6300, maintaining system integration with existing compressed air infrastructure while providing reliable actuation force for dust discharge operations. The valve linkage(s)/connecting rod(s) (for VL3) 154 may transmit actuator motion from the pneumatic actuator (for VL3) 152 to the third valve (VL3) 150, enabling controlled valve positioning that allows dust particles 214 to discharge through the outlet opening 124 into the product stream 220 moving along the conveyor chain 182. The dust particles 214 may integrate with the product stream 220 within the conveyor housing 180, where material transport continues along the conveyor chain 182 driven by the drive sprocket 184 during normal conveyor operations. The timer relay (RT-3) 206 may control the duration of the second airlock operation (VL3 open, dust dropping to conveyor) 6300 by providing time delays ranging from 3 seconds to 15 seconds for coordinating sequential operation of the third valve (VL3) 150 based on dust accumulation rates and conveyor system characteristics.

With continued reference to FIG. 6D, the plenum walls 116 may remain in a contracted configuration during the second airlock operation (VL3 open, dust dropping to conveyor) 6300, with the plenum chamber 118 returning to normal operational dimensions following the dissipation of the positive pressure pulse 224 from previous cleaning operations. The upper housing 112 and lower housing 114 may maintain structural integrity during the second airlock operation (VL3 open, dust dropping to conveyor) 6300, with the intermediate dust collection chamber 120 serving as the primary staging area for dust particles 214 before discharge into the conveyor housing 180. The pneumatic actuator (for VL1) 132 may maintain the first valve (VL1) 130 in the closed configuration through the valve linkage(s)/connecting rod(s) (for VL1) 134, while the valve seal(s)/gasket(s) (for VL1) 136 may provide airtight sealing to prevent any residual pressure from the cleaning operations from affecting the conveyor housing 180 during dust discharge sequences. The pneumatic actuator (for VL2) 142 may similarly maintain the second valve (VL2) 140 in the closed position through the valve linkage(s)/connecting rod(s) (for VL2) 144, ensuring that the intermediate dust collection chamber 120 remains isolated from the plenum chamber 118 during dust discharge operations. The airlock configuration established by the closed first valve (VL1) 130, closed second valve (VL2) 140, and opened third valve (VL3) 150 may provide controlled dust discharge while maintaining isolation between the spot dust filter 100 and the conveyor environment, preventing cleaning pulse pressure from propagating toward the conveyor housing 180 during dust transfer operations.

The control system 200 may coordinate the second airlock operation (VL3 open, dust dropping to conveyor) 6300 through the electrical connections 210 and third valve control signal (VL3) 234 to ensure proper timing with previous operational phases in the dust discharge sequence. The timing control provided by the timer relay (RT-3) 206 may ensure that sufficient time may be allocated for complete dust particle discharge from the intermediate dust collection chamber 120 into the conveyor housing 180 while preventing excessive exposure time that could compromise system isolation performance. The conveyor lid 186 may maintain containment of the product stream 220 during the second airlock operation (VL3 open, dust dropping to conveyor) 6300, with the discharged dust particles 214 integrating with the product stream 220 without affecting the surrounding environment or causing fugitive dust emissions. The conveyor inlet opening 190 and conveyor outlet opening 192 may facilitate continued material flow through the conveyor housing 180 during the second airlock operation (VL3 open, dust dropping to conveyor) 6300, with the discharged dust particles 214 becoming part of the normal material transport process along the conveyor chain 182. The second airlock operation (VL3 open, dust dropping to conveyor) 6300 may represent the final phase in the dust discharge sequence that returns collected dust particles 214 to the product stream 220 while maintaining isolation between cleaning pulse operations and the conveyor environment, preparing the dust control system 110 for subsequent return to normal filtration operations through coordinated valve repositioning sequences.

Figure 7A:
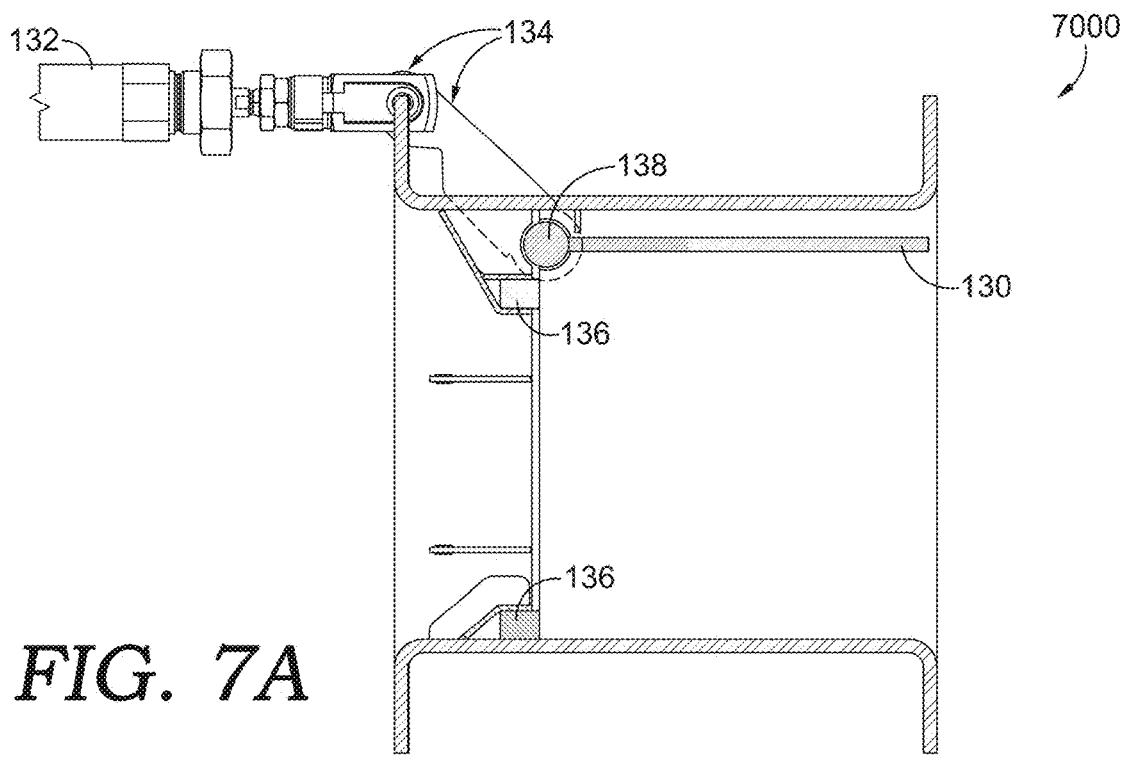
FIGS. 7A-7B illustrate sectional views showing different positions of the first valve, demonstrating the valve's pivoting mechanism and sealing capability during operation.
Figure 7B:
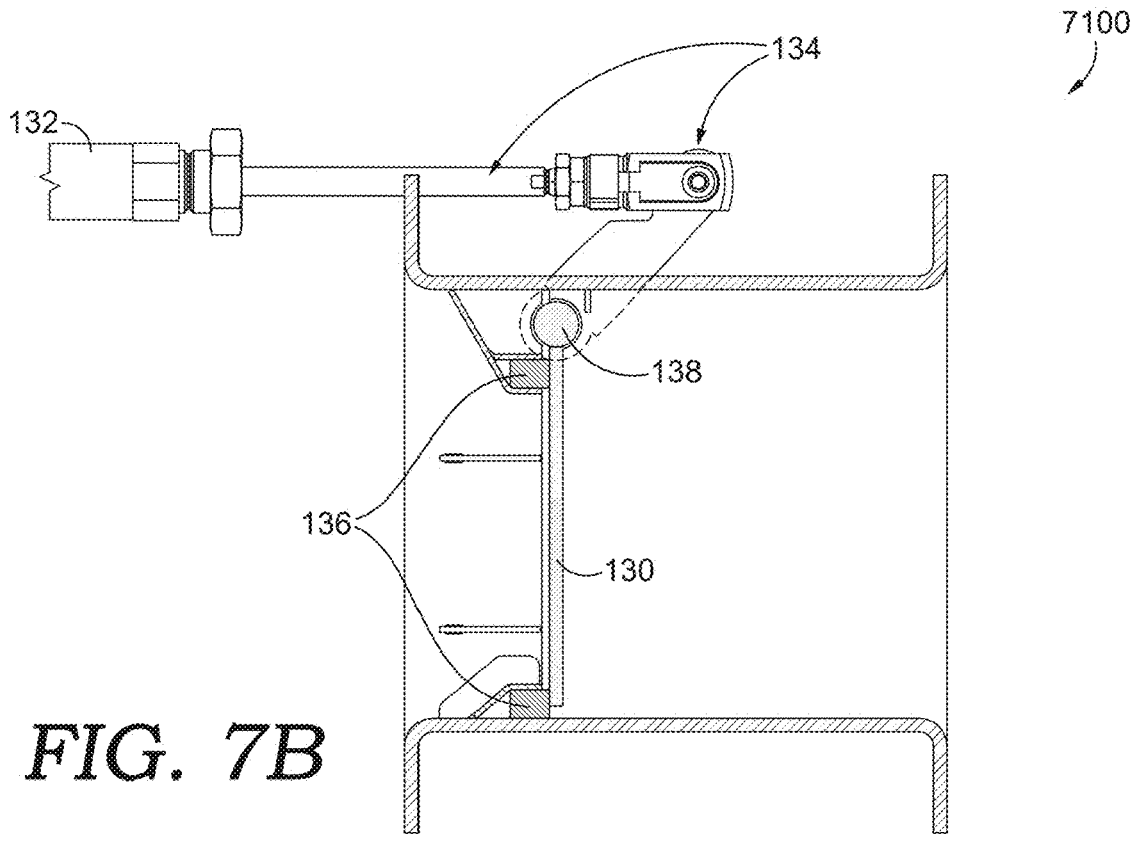

Referring to FIGS. 7A-7B, sectional views illustrate the mechanical operation and positioning configurations of the first valve (VL1) 130 during different operational phases of the dust control system 110. The first valve (VL1) 130 may incorporate mechanical components that enable controlled positioning between open and closed configurations to regulate airflow between the spot dust filter 100 and the conveyor housing 180 during normal filtration operations and cleaning pulse isolation sequences. The pneumatic actuator (for VL1) 132 may provide the mechanical force required to position the first valve (VL1) 130 between operational configurations, with actuation force generated by compressed air supplied through the compressed air supply line 106 that also serves the spot dust filter 100 cleaning operations. The valve linkage(s)/connecting rod(s) (for VL1) 134 may mechanically couple the pneumatic actuator (for VL1) 132 to the first valve (VL1) 130, transmitting linear actuator motion into rotational valve movement that positions the valve element between open and closed configurations during operational sequences.

FIG. 7A illustrates a first valve in open position 7000 where the first valve (VL1) 130 may be positioned to allow unrestricted airflow through the inlet/vacuum duct 122 during normal filtration operations. During the first valve in open position 7000, the pneumatic actuator (for VL1) 132 may maintain the valve element in a configuration that provides minimal flow restriction, allowing the airflow (normal operation) 216 and dust particles 214 to pass through the first valve (VL1) 130 toward the filter element 102 within the spot dust filter 100. The valve linkage(s)/connecting rod(s) (for VL1) 134 may position the valve element away from the flow path through mechanical connections that translate pneumatic actuator (for VL1) 132 motion into controlled valve positioning. The valve pivot point(s)/hinge(s) (for VL1) 138 may define the rotational axis for the first valve (VL1) 130, enabling controlled movement between the first valve in open position 7000 and alternative positioning configurations during operational sequences. The valve seal(s)/gasket(s) (for VL1) 136 may be positioned away from sealing surfaces during the first valve in open position 7000, allowing unrestricted airflow while maintaining sealing capability for subsequent valve closure operations.

FIG. 7B depicts a first valve in closed position 7100 where the first valve (VL1) 130 may be positioned to provide airtight isolation between the spot dust filter 100 and the conveyor housing 180 during cleaning pulse operations. During the first valve in closed position 7100, the pneumatic actuator (for VL1) 132 may position the valve element to block airflow through the inlet/vacuum duct 122, preventing cleaning pulse pressure from propagating toward the conveyor housing 180 during filter regeneration cycles. The valve linkage(s)/connecting rod(s) (for VL1) 134 may transmit actuator motion to position the valve element across the flow path, with mechanical connections providing controlled valve closure in response to the first valve control signal (VL1) 230 generated by the control system 200. The valve seal(s)/gasket(s) (for VL1) 136 may engage with sealing surfaces during the first valve in closed position 7100, creating airtight isolation that prevents cleaning pulse airflow 218 and positive pressure pulse 224 from affecting the conveyor housing 180 during cleaning operations. The valve pivot point(s)/hinge(s) (for VL1) 138 may facilitate rotational movement of the valve element from the first valve in open position 7000 to the first valve in closed position 7100, with pivot mechanisms providing controlled angular positioning during valve operation sequences.

With continued reference to FIGS. 7A-7B, the pneumatic actuator (for VL1) 132 may incorporate internal mechanisms that convert compressed air pressure into linear mechanical force, with actuator operation controlled by solenoid valves that direct compressed air flow in response to electrical control signals from the control system 200. The pneumatic actuator (for VL1) 132 may utilize compressed air supplied to the spot dust filter 100 for valve operation, eliminating the need for separate pneumatic supply systems while providing consistent actuation force during repeated operational cycles. The valve linkage(s)/connecting rod(s) (for VL1) 134 may incorporate mechanical connections that accommodate the angular movement required to transition the first valve (VL1) 130 between the first valve in open position 7000 and the first valve in closed position 7100, with linkage geometry designed to provide controlled valve positioning throughout the operational range. The valve linkage(s)/connecting rod(s) (for VL1) 134 may include adjustable connections that accommodate manufacturing tolerances and provide precise control over valve sealing engagement during closure operations, ensuring reliable isolation performance during cleaning pulse sequences.

The valve seal(s)/gasket(s) (for VL1) 136 may be constructed from elastomeric materials that provide flexible sealing engagement with valve seating surfaces during the first valve in closed position 7100 while accommodating repeated compression and release cycles during valve operation. The valve seal(s)/gasket(s) (for VL1) 136 may incorporate sealing geometries that provide controlled contact pressure against sealing surfaces, with sealing effectiveness maintained across varying operating conditions and valve wear patterns encountered during extended service periods. The valve pivot point(s)/hinge(s) (for VL1) 138 may incorporate bearing surfaces or mechanical connections that provide controlled rotational movement while minimizing friction and wear during repeated valve positioning cycles between the first valve in open position 7000 and the first valve in closed position 7100. The valve pivot point(s)/hinge(s) (for VL1) 138 may be positioned to provide mechanical advantage that reduces the actuator force required for valve operation while maintaining precise control over valve positioning during operational sequences. The transition between the first valve in open position 7000 and the first valve in closed position 7100 may occur in response to the regeneration signal 226 intercepted by the control system 200, with valve positioning coordinated through the latching relay (RT-1) 202 and first valve control signal (VL1) 230 to provide controlled isolation during cleaning pulse operations while maintaining reliable airflow during normal filtration cycles.

Figure 7C:
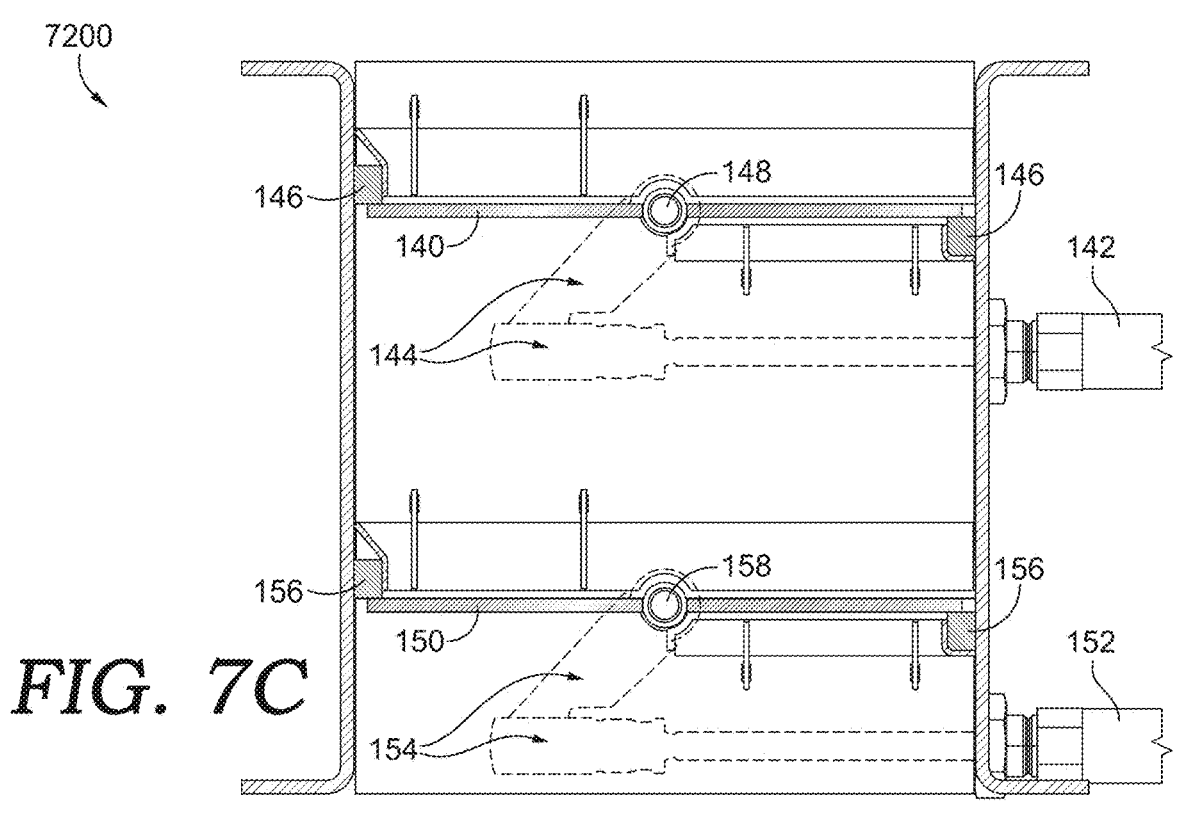
FIGS. 7C-7D illustrate sectional views of the second and third valves in different operational positions, showing how these valves coordinate to create effective airlock functionality.
Figure 7D:
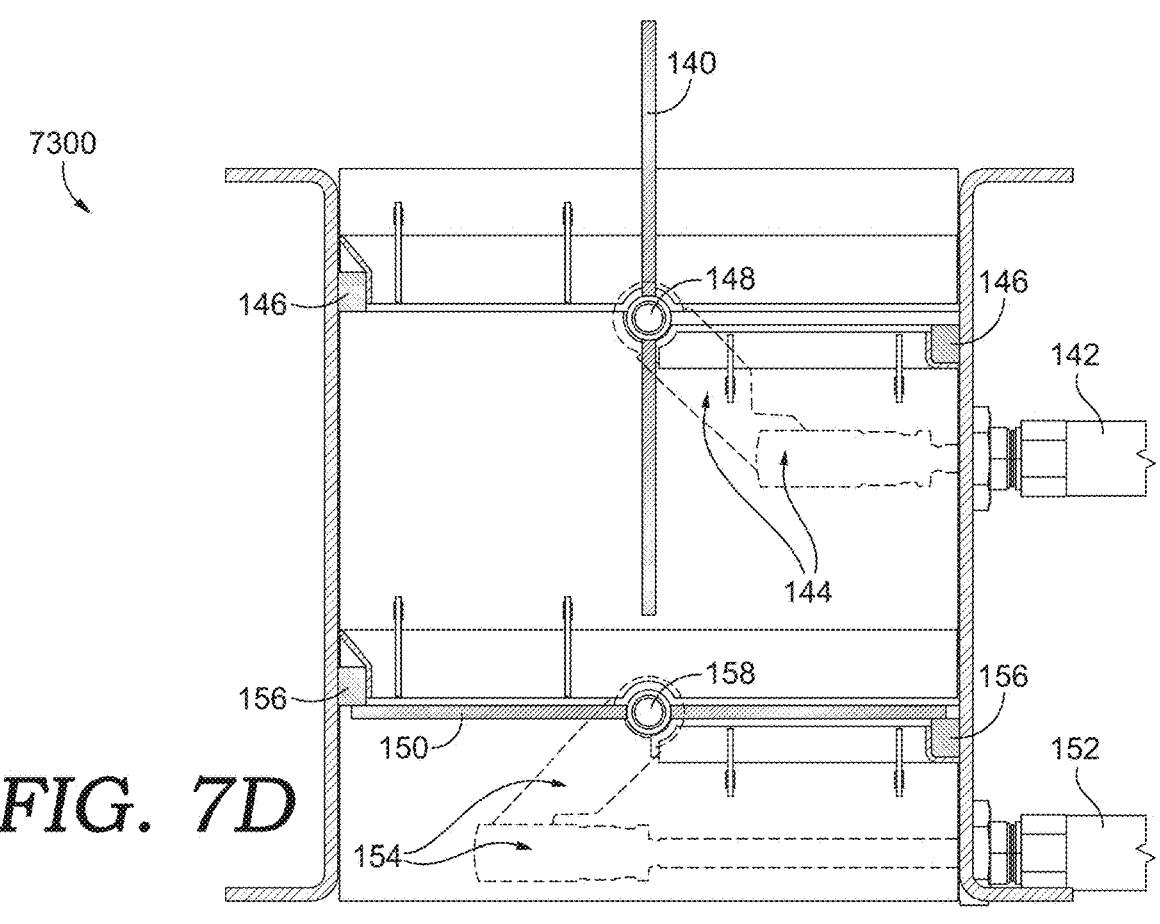

Referring to FIGS. 7C-7D, sectional views illustrate the coordinated mechanical operation and positioning configurations of the second valve (VL2) 140 and third valve (VL3) 150 during different operational phases of the airlock mechanism within the dust control system 110. The second valve (VL2) 140 and third valve (VL3) 150 may incorporate mechanical components that enable controlled positioning between open and closed configurations to regulate dust flow from the plenum chamber 118 through the intermediate dust collection chamber 120 to the conveyor housing 180 during sequential dust discharge operations. The pneumatic actuator (for VL2) 142 and pneumatic actuator (for VL3) 152 may provide the mechanical force required to position the second valve (VL2) 140 and third valve (VL3) 150 between operational configurations, with actuation force generated by compressed air supplied through the compressed air supply line 106 that also serves the spot dust filter 100 cleaning operations. The valve linkage(s)/connecting rod(s) (for VL2) 144 and valve linkage(s)/connecting rod(s) (for VL3) 154 may mechanically couple the respective pneumatic actuators to the valve assemblies, transmitting linear actuator motion into rotational valve movement that positions the valve elements between open and closed configurations during coordinated operational sequences.

FIG. 7C illustrates a second and third valves in closed positions 7200 where both the second valve (VL2) 140 and third valve (VL3) 150 may be positioned to prevent dust flow through the airlock mechanism during cleaning pulse isolation operations or between dust transfer sequences. During the second and third valves in closed positions 7200, the pneumatic actuator (for VL2) 142 may maintain the second valve (VL2) 140 in a configuration that blocks dust particle flow from the plenum chamber 118 to the intermediate dust collection chamber 120, while the pneumatic actuator (for VL3) 152 simultaneously maintains the third valve (VL3) 150 in a configuration that prevents dust discharge from the intermediate dust collection chamber 120 to the conveyor housing 180. The valve linkage(s)/connecting rod(s) (for VL2) 144 may position the second valve (VL2) 140 element across the flow path through mechanical connections that translate pneumatic actuator (for VL2) 142 motion into controlled valve closure, while the valve linkage(s)/connecting rod(s) (for VL3) 154 similarly position the third valve (VL3) 150 element to block the discharge opening during the second and third valves in closed positions 7200. A valve seal(s)/gasket(s) (for VL2) 146 may engage with sealing surfaces during the second and third valves in closed positions 7200, creating airtight isolation that prevents dust particles 214 from bypassing the intermediate dust collection chamber 120 during cleaning pulse operations or between dust transfer sequences. A valve pivot point(s)/hinge(s) (for VL2) 148 may define the rotational axis for the second valve (VL2) 140, enabling controlled movement between closed and open positions during airlock operation sequences, while a valve seal(s)/gasket(s) (for VL3) 156 and a valve pivot point(s)/hinge(s) (for VL3) 158 may provide similar sealing and rotational functionality for the third valve (VL3) 150 during coordinated valve positioning operations.

FIG. 7D depicts a second valve in open position, third valve in closed position 7300 where the second valve (VL2) 140 may be positioned to allow controlled dust transfer from the plenum chamber 118 to the intermediate dust collection chamber 120 while the third valve (VL3) 150 remains closed to maintain isolation between the intermediate dust collection chamber 120 and the conveyor housing 180. During the second valve in open position, third valve in closed position 7300, the pneumatic actuator (for VL2) 142 may position the second valve (VL2) 140 element away from the flow path to allow dust particles 214 to pass through the valve opening under gravitational influence, while the pneumatic actuator (for VL3) 152 maintains the third valve (VL3) 150 in the closed configuration to prevent premature dust discharge into the conveyor housing 180. The valve linkage(s)/connecting rod(s) (for VL2) 144 may transmit actuator motion to position the second valve (VL2) 140 element in the open configuration in response to the second valve control signal (VL2) 232 generated by the control system 200, while the valve linkage(s)/connecting rod(s) (for VL3) 154 maintain the third valve (VL3) 150 in the closed position during the dust transfer sequence. The valve seal(s)/gasket(s) (for VL2)

146 may be positioned away from sealing surfaces during the second valve in open position, third valve in closed position 7300, allowing unrestricted dust flow while the valve seal(s)/gasket(s) (for VL3) 156 maintain airtight engagement with sealing surfaces to prevent dust bypass during the controlled transfer operation. The valve pivot point(s)/hinge(s) (for VL2) 148 may facilitate rotational movement of the second valve (VL2) 140 element from the closed position to the open configuration, while the valve pivot point(s)/hinge(s) (for VL3) 158 maintain the third valve (VL3) 150 in the closed position during the airlock sequence that isolates dust transfer operations from the conveyor housing 180.

With continued reference to FIGS. 7C-7D, the coordinated positioning of the second valve (VL2) 140 and third valve (VL3) 150 may create an airlock mechanism that provides controlled dust transfer while maintaining isolation between the plenum chamber 118 and the conveyor housing 180 during cleaning pulse operations. The pneumatic actuator (for VL2) 142 and pneumatic actuator (for VL3) 152 may operate independently under control of the timer relay (RT-2) 204 and timer relay (RT-3) 206, with timing sequences coordinated to prevent simultaneous opening of both valves that could compromise isolation performance during dust discharge operations. The valve linkage(s)/connecting rod(s) (for VL2) 144 and valve linkage(s)/connecting rod(s) (for VL3) 154 may incorporate mechanical connections that accommodate the angular movement required to transition between the second and third valves in closed positions 7200 and the second valve in open position, third valve in closed position 7300, with linkage geometry designed to provide controlled valve positioning throughout the operational range. The valve seal(s)/gasket(s) (for VL2) 146 and valve seal(s)/gasket(s) (for VL3) 156 may be constructed from elastomeric materials that provide flexible sealing engagement with valve seating surfaces during closed positions while accommodating repeated compression and release cycles during valve operation sequences. The valve pivot point(s)/hinge(s) (for VL2) 148 and valve pivot point(s)/hinge(s) (for VL3) 158 may incorporate bearing surfaces or mechanical connections that provide controlled rotational movement while minimizing friction and wear during repeated valve positioning cycles between closed and open configurations during airlock operation sequences.

Figure 7E:
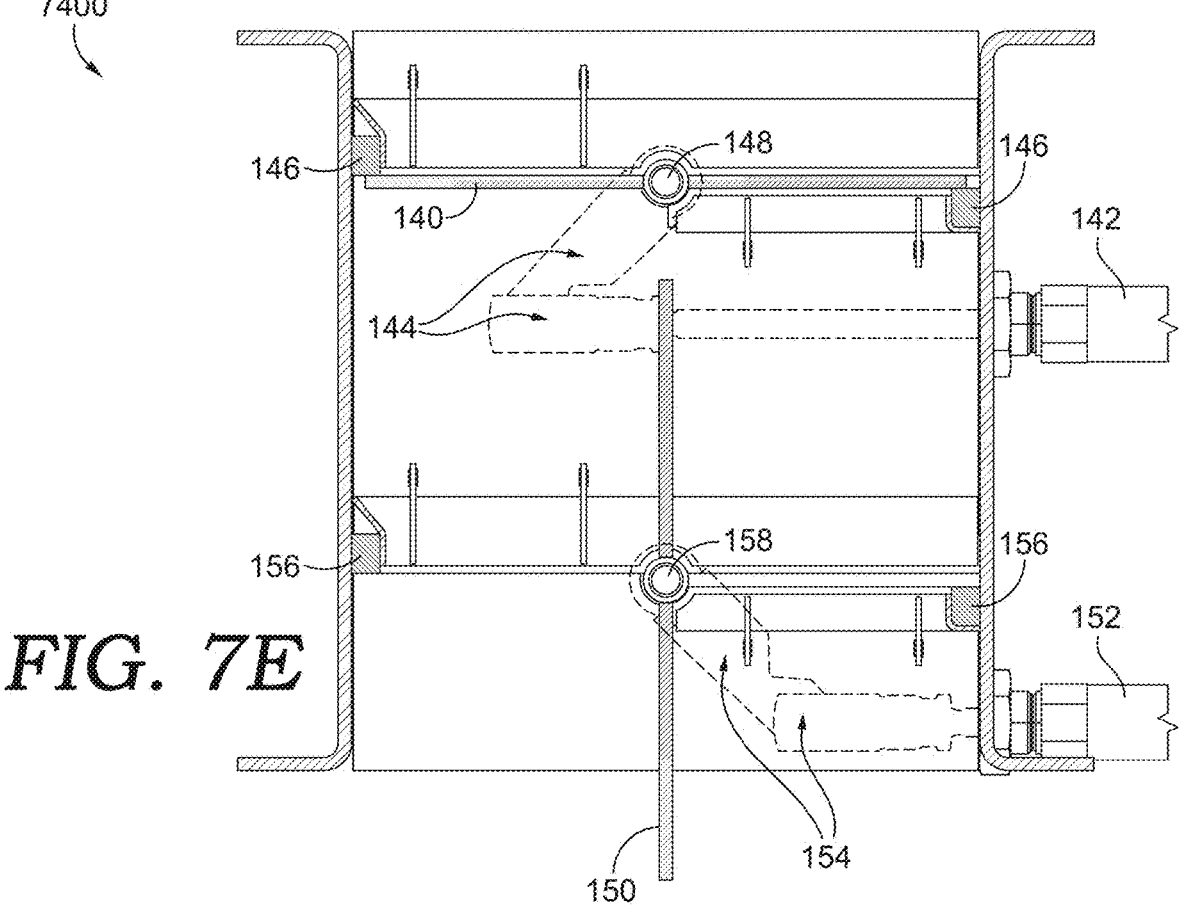
FIG. 7E illustrates a sectional view showing the second valve in closed position while the third valve is in open position, demonstrating the final phase of the dust discharge sequence.

Referring to FIG. 7E, a sectional view illustrates a second valve in closed position, third valve in open position 7400 where the second valve (VL2) 140 may be positioned to isolate the intermediate dust collection chamber 120 from the plenum chamber 118 while the third valve (VL3) 150 may be positioned to allow controlled dust discharge from the intermediate dust collection chamber 120 into the conveyor housing 180. During the second valve in closed position, third valve in open position 7400, the pneumatic actuator (for VL2) 142 may maintain the second valve (VL2) 140 element across the flow path to prevent dust particles 214 from entering the intermediate dust collection chamber 120 from the plenum chamber 118, while the pneumatic actuator (for VL3) 152 positions the third valve (VL3) 150 element away from the discharge opening to allow accumulated dust particles 214 to flow into the product stream 220 within the conveyor housing 180. The valve linkage(s)/connecting rod(s) (for VL2) 144 may maintain the second valve (VL2) 140 in the closed configuration through mechanical connections that provide controlled valve closure, while the valve linkage(s)/connecting rod(s) (for VL3) 154 transmit actuator motion to position the third valve (VL3) 150 element in the open configuration in response to the third valve control signal (VL3) 234 generated by the control system 200 during the final phase of the dust discharge sequence. The valve seal(s)/gasket(s) (for VL2) 146 may engage with sealing surfaces during the second valve in closed position, third valve in open position 7400, creating airtight isolation that prevents dust particles 214 from bypassing the intermediate dust collection chamber 120 during discharge operations, while the valve seal(s)/gasket(s) (for VL3) 156 may be positioned away from sealing surfaces to allow unrestricted dust discharge through the outlet opening 124. The valve pivot point(s)/hinge(s) (for VL2) 148 may maintain the second valve (VL2) 140 in the closed position during dust discharge operations, while the valve pivot point(s)/hinge(s) (for VL3) 158 facilitate rotational movement of the third valve (VL3) 150 element from the closed position to the open configuration during the controlled discharge sequence that returns collected dust particles 214 to the product stream 220.

The airlock functionality created by the coordinated operation of the second valve (VL2) 140 and third valve (VL3) 150 may provide sequential dust transfer that maintains isolation between cleaning pulse operations and the conveyor housing 180 throughout the dust discharge process. The transition from the second and third valves in closed positions 7200 through the second valve in open position, third valve in closed position 7300 to the second valve in closed position, third valve in open position 7400 may occur under control of the timer relay (RT-2) 204 and timer relay (RT-3) 206, with timing sequences providing adjustable time delays between 3 seconds and 15 seconds for coordinating valve operations based on dust characteristics and system configuration requirements. The pneumatic actuator (for VL2) 142 and pneumatic actuator (for VL3) 152 may utilize compressed air supplied to the spot dust filter 100 for valve operation during airlock sequences, eliminating the need for separate pneumatic supply systems while providing consistent actuation force during repeated operational cycles. The valve seal(s)/gasket(s) (for VL2) 146 and valve seal(s)/gasket(s) (for VL3) 156 may incorporate sealing geometries that provide controlled contact pressure against sealing surfaces, with sealing effectiveness maintained across varying operating conditions and valve wear patterns encountered during extended service periods. The valve pivot point(s)/hinge(s) (for VL2) 148 and valve pivot point(s)/hinge(s) (for VL3) 158 may be positioned to provide mechanical advantage that reduces the actuator force required for valve operation while maintaining precise control over valve positioning during coordinated airlock sequences that prevent simultaneous opening of both valves and maintain system isolation performance during dust discharge operations.

Figure 8:
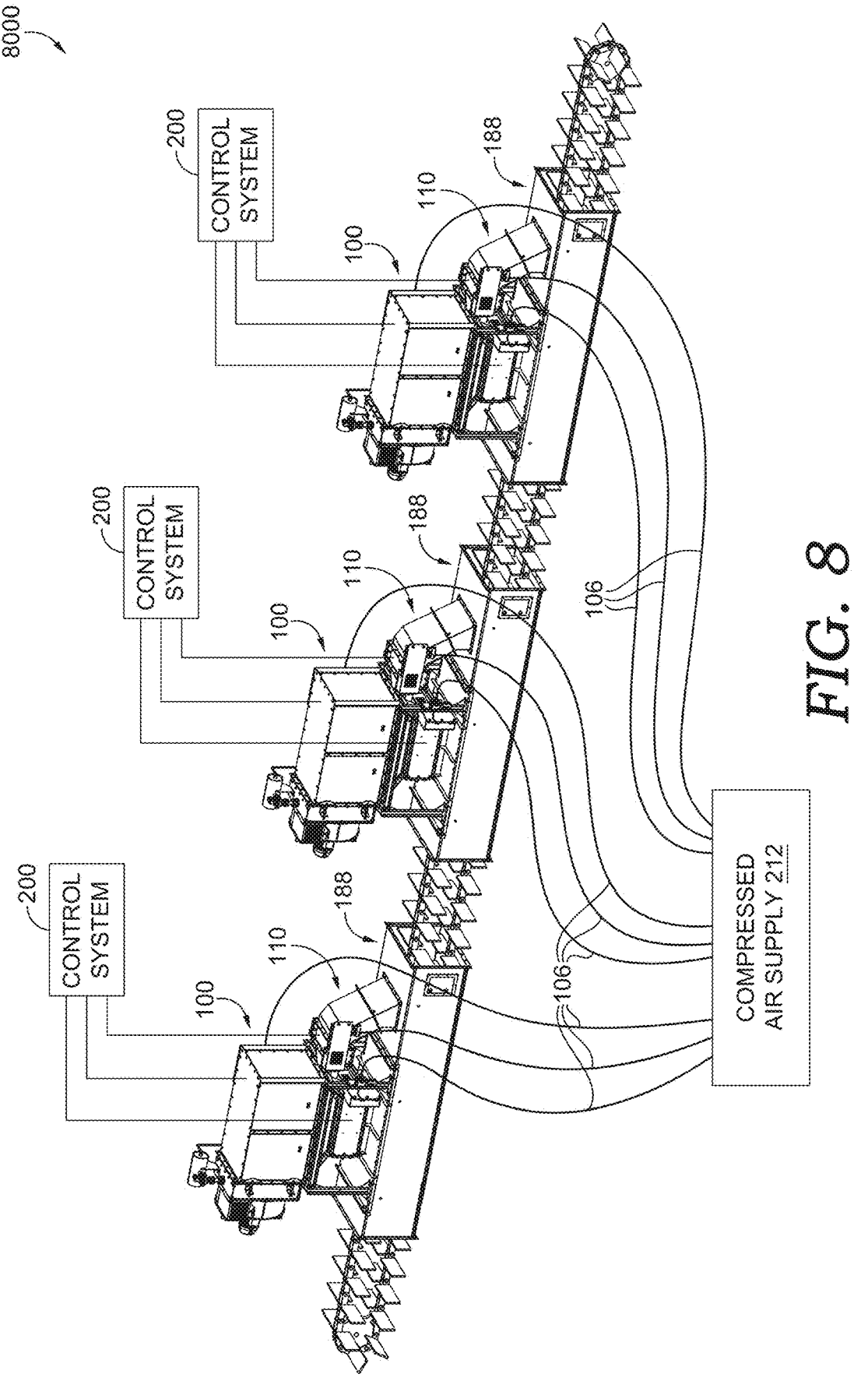
FIG. 8 illustrates an installation context showing multiple dust control systems installed along a conveyor line, demonstrating the scalability and practical implementation of the system in industrial environments.

Referring to FIG. 8, an installation context showing multiple dust control systems installed along a conveyor line 8000 illustrates the deployment configuration for multiple dust control systems 110 positioned in series along an extended conveyor body 188 to provide comprehensive dust management across extended material handling operations. The installation context showing multiple dust control systems installed along a conveyor line 8000 may demonstrate how individual dust control systems 110 may be integrated at predetermined intervals along the conveyor body 188 to maintain effective dust collection performance across varying conveyor lengths and material loading conditions. Each dust control system 110 may be positioned between a corresponding spot dust filter 100 and the conveyor body 188, with individual installations providing localized dust management while contributing to overall system performance across the extended conveyor line. The spacing between individual dust control systems 110 may be determined based on conveyor length, material characteristics, dust generation rates, and airflow requirements that vary along different sections of the conveyor body 188 during material transport operations.

A compressed air supply 212 may provide pressurized air distribution to multiple spot dust filters 100 through individual compressed air supply lines 106 that connect each spot dust filter 100 to the centralized compressed air infrastructure. The compressed air supply 212 may incorporate pressure regulation, filtration, and distribution components that ensure consistent air pressure and quality across all connected spot dust filters 100 and associated dust control systems 110 during cleaning operations. The compressed air supply lines 106 may be sized and configured to accommodate the simultaneous operation of multiple cleaning cycles across different dust control systems 110, with supply capacity designed to prevent pressure drops that could compromise cleaning effectiveness during concurrent regeneration operations. The compressed air supply 212 may incorporate redundancy features such as multiple compressors, backup systems, or pressure accumulation tanks that maintain consistent compressed air availability during peak demand periods when multiple spot dust filters 100 may initiate cleaning cycles simultaneously.

With continued reference to FIG. 8, the control system 200 may coordinate the operation of multiple dust control systems 110 through centralized control architecture that manages valve sequencing, timing coordination, and operational monitoring across the extended conveyor installation. The control system 200 may incorporate communication interfaces that connect individual dust control systems 110 to centralized monitoring and control equipment, enabling coordinated operation that prevents simultaneous cleaning cycles that could overload the compressed air supply 212 or create operational conflicts between adjacent installations. The electrical connections 210 may distribute control signals and power to multiple dust control systems 110 through wiring networks that provide individual control capability while maintaining centralized coordination through the control system 200. The control system 200 may incorporate scheduling algorithms that stagger cleaning cycles across multiple dust control systems 110 to optimize compressed air supply 212 utilization while maintaining effective dust collection performance across all installations along the conveyor body 188.

The control system 200 may incorporate position sensors that may be added to each valve within individual dust control systems 110 to provide feedback confirmation of proper operation across multiple installations. The position sensors may monitor the first valve (VL1) 130, second valve (VL2) 140, and third valve (VL3) 150 positioning within each dust control system 110, transmitting valve status information to the control system 200 through the electrical connections 210 for centralized monitoring and diagnostic evaluation. The position sensors may detect valve positioning anomalies, mechanical failures, or operational irregularities that could compromise dust control performance, enabling the control system 200 to implement corrective actions or alert maintenance personnel to address system malfunctions before operational performance may be affected. The position sensors may provide real-time feedback that enables the control system 200 to verify proper valve sequencing during cleaning cycles, ensuring that isolation and airlock functions operate correctly across all dust control systems 110 during coordinated cleaning operations.

Pressure sensors may monitor the plenum chamber 118 expansion within individual dust control systems 110 and provide diagnostic information to the control system 200 regarding cleaning pulse effectiveness, plenum walls 116 performance, and system isolation integrity during cleaning operations. The pressure sensors may detect pressure variations within the plenum chamber 118 during cleaning pulse airflow 218 operations, providing feedback that enables the control system 200 to evaluate cleaning effectiveness and adjust timing parameters for enhanced dust collection performance. The pressure sensors may monitor pressure conditions that indicate potential over-pressurization situations within the plenum chamber 118, enabling the control system 200 to implement protective measures or alert operators to system conditions that may require attention. The pressure sensors may provide diagnostic information that enables predictive maintenance scheduling based on measured performance parameters, allowing maintenance personnel to address potential issues before system failures occur across multiple dust control systems 110 installations.

In some cases, pressure relief valves may be integrated into the plenum chamber 118 within individual dust control systems 110 to prevent over-pressurization that could damage the plenum walls 116 or compromise system isolation performance during cleaning operations. The pressure relief valves may be calibrated to open at predetermined pressure levels that protect system components while maintaining effective cleaning pulse containment within the plenum chamber 118 during normal cleaning operations. The pressure relief valves may discharge excess pressure to safe locations that prevent environmental contamination while protecting the dust control system 110 from damage during abnormal operating conditions or compressed air supply 212 malfunctions. The pressure relief valves may incorporate adjustable pressure settings that accommodate different operating conditions and cleaning pulse intensities encountered across various dust control systems 110 installations along the conveyor body 188.

Emergency bypass valves may allow manual override of the control system 200 in case of control system failure, enabling continued conveyor operation while individual dust control systems 110 may be isolated or bypassed during maintenance or repair operations. The emergency bypass valves may provide manual control capability that allows operators to position the first valve (VL1) 130, second valve (VL2) 140, and third valve (VL3) 150 independently of the control system 200, enabling continued material transport through the conveyor body 188 during control system malfunctions or maintenance activities. The emergency bypass valves may incorporate manual actuators or mechanical overrides that operate independently of the compressed air supply 212 and electrical connections 210, providing failsafe operation capability during system emergencies or power failures. The emergency bypass valves may be positioned to provide accessible manual control while maintaining safety protocols that prevent inadvertent operation during normal automated control sequences managed by the control system 200.

Visual indicators or alarms may signal system status and maintenance requirements across multiple dust control systems 110 installations, providing operators with immediate feedback regarding operational performance and maintenance needs. The visual indicators may display valve positioning status, cleaning cycle progress, system alarms, and maintenance alerts through display panels or indicator lights positioned for operator visibility during routine facility operations. The visual indicators may incorporate color-coded displays that provide immediate status recognition, with different colors indicating normal operation, cleaning cycles in progress, maintenance requirements, or system alarms that require operator attention. The alarms may provide audible or visual alerts that notify operators of system malfunctions, maintenance requirements, or operational anomalies that require immediate attention across individual dust control systems 110 or the overall installation along the conveyor body 188. The visual indicators and alarms may interface with facility management systems or remote monitoring equipment through the electrical connections 210, enabling centralized monitoring and alert distribution to maintenance personnel or facility operators responsible for multiple dust control systems 110 installations.

The coordinated operation of multiple dust control systems 110 along the conveyor body 188 may provide comprehensive dust management that maintains clean environmental conditions across extended material handling operations while optimizing compressed air supply 212 utilization and maintenance requirements. The installation context showing multiple dust control systems installed along a conveyor line 8000 may demonstrate scalability that accommodates varying facility sizes and conveyor configurations while maintaining consistent dust control performance across all installations. The control system 200 may incorporate communication protocols that enable individual dust control systems 110 to operate independently while maintaining coordination that prevents operational conflicts and optimizes overall system performance across the extended conveyor installation.

Figure 9:
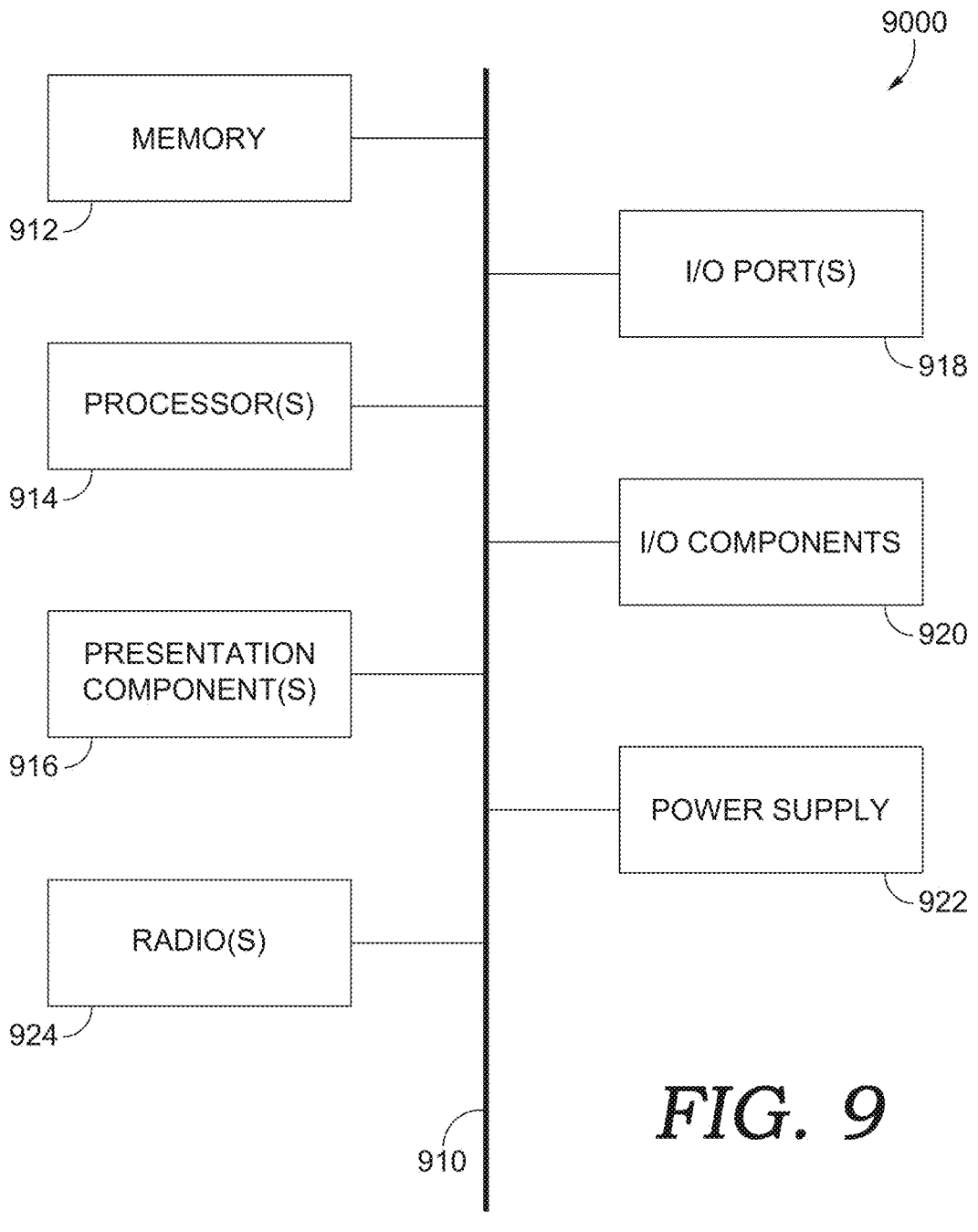
FIG. 9 illustrates a block diagram of a computing device, showing the electronic components that can be used to implement automated control and monitoring of the dust control system.

Referring to FIG. 9, a computing device 9000 may provide advanced control and monitoring capabilities for the dust control system 110 through integrated hardware and software components that enable sophisticated operational management beyond basic relay-based control systems. The computing device 9000 may incorporate multiple interconnected modules that work together to provide enhanced functionality including real-time monitoring, predictive maintenance scheduling, remote system access, and adaptive control algorithms that optimize dust collection performance based on varying operational conditions. The computing device 9000 may be implemented as part of the control system 200 to provide programmable logic controller functionality, microcontroller-based system control, or distributed control system capabilities that enhance operational control and diagnostic functionality across single or multiple dust control system 110 installations. The computing device 9000 may enable integration with plant-wide control systems, facility management networks, and remote monitoring infrastructure to provide centralized coordination and oversight of dust control operations across extended conveyor installations. The computing device 9000 may incorporate plenum pressure monitoring capabilities that track expansion and contraction cycles of the plenum walls 116, providing real-time feedback on pressure accommodation performance and enabling predictive maintenance scheduling based on plenum wall stress analysis and expansion cycle counting.

A central bus 910 may provide the primary communication pathway that interconnects all hardware modules within the computing device 9000, enabling data transfer, control signal distribution, and coordinated operation between different functional components during system operation. The central bus 910 may incorporate high-speed data transmission capabilities that support real-time control requirements for valve positioning, timing coordination, and sensor data processing during cleaning cycles and normal filtration operations. The central bus 910 may utilize standardized communication protocols that enable modular system expansion, component replacement, and integration with external systems while maintaining reliable data transmission under varying environmental conditions encountered in industrial conveyor applications. The central bus 910 may provide electrical isolation and signal conditioning that protects sensitive electronic components from electrical interference generated by pneumatic actuators, motor drives, and other industrial equipment operating in proximity to the dust control system 110 installations.

A memory module 912 may be connected to the central bus 910 to provide data storage capabilities for control algorithms, operational parameters, historical performance data, and system configuration information that supports advanced dust control functionality. The memory module 912 may incorporate non-volatile storage that retains critical system parameters and operational settings during power interruptions or system maintenance activities, ensuring consistent system performance when operations resume. The memory module 912 may store multiple timing profiles that may be selected based on the specific product being conveyed through the conveyor housing 180, allowing optimization of cleaning cycles and dust discharge sequences for different material handling operations without manual reconfiguration. The memory module 912 may maintain historical performance data that enables predictive maintenance scheduling, trend analysis, and operational optimization based on measured system performance over extended operational periods. The memory module 912 may provide sufficient storage capacity for data logging functions that record valve positioning sequences, cleaning cycle effectiveness, pressure variations within the plenum chamber 118, and other operational parameters that support system diagnostics and performance evaluation.

With continued reference to FIG. 9, a processor module 914 may be connected to the central bus 910 to provide computational capabilities that execute control algorithms, process sensor data, coordinate valve operations, and manage communication with external systems during dust control operations. The processor module 914 may implement sophisticated timing algorithms that provide more precise control over the latching relay (RT-1) 202, timer relay (RT-2) 204, and timer relay (RT-3) 206 functionality compared to basic relay-based control systems, enabling adaptive timing adjustments based on real-time operational conditions. The processor module 914 may process input signals from position sensors that monitor the first valve (VL1) 130, second valve (VL2) 140, and third valve (VL3) 150 positioning, providing feedback confirmation of proper operation and detecting valve positioning anomalies that could compromise dust control performance. The processor module 914 may analyze pressure sensor data that monitors the plenum chamber 118 expansion during cleaning pulse airflow 218 operations, enabling evaluation of cleaning effectiveness and adjustment of timing parameters for enhanced dust collection performance. The processor module 914 may coordinate multiple dust control system 110 installations through communication interfaces that prevent simultaneous cleaning cycles and optimize compressed air supply 212 utilization across extended conveyor installations.

A presentation module 916 may be coupled to the central bus 910 to provide visual display capabilities that present system status information, operational parameters, maintenance alerts, and diagnostic data to facility operators and maintenance personnel. The presentation module 916 may incorporate display screens, indicator panels, or graphical user interfaces that provide real-time visualization of valve positioning status, cleaning cycle progress, system performance metrics, and alarm conditions across individual or multiple dust control system 110 installations. The presentation module 916 may display historical performance trends, maintenance schedules, and operational statistics that support facility management decisions and maintenance planning activities. The presentation module 916 may provide interactive interfaces that enable operators to adjust timing parameters, select operational modes, acknowledge alarms, and access diagnostic information without requiring specialized technical knowledge or external programming equipment. The presentation module 916 may support remote display capabilities that enable system monitoring from centralized control rooms or mobile devices through network connections established through communication interfaces within the computing device 9000.

An input output port 918 may be connected to the central bus 910 to provide physical connection interfaces for external sensors, control devices, communication networks, and other equipment that integrates with the dust control system 110 during advanced operational modes. The input output port 918 may accommodate various sensor types including position sensors, pressure sensors, level sensors, temperature sensors, and vibration sensors that provide comprehensive monitoring of dust control system 110 performance and environmental conditions. The input output port 918 may provide connection interfaces for emergency bypass valves that allow manual override of the control system 200 during system failures or maintenance activities, enabling continued conveyor operation while individual dust control systems 110 may be isolated or serviced. The input output port 918 may support communication with facility management systems, plant-wide control networks, and remote monitoring equipment that enable centralized coordination of multiple dust control system 110 installations across extended conveyor lines. The input output port 918 may incorporate signal conditioning, electrical isolation, and protection circuits that ensure reliable operation under varying environmental conditions while protecting the computing device 9000 from electrical interference or damage caused by external equipment malfunctions.

An input output component 920 may be connected to the central bus 910 to provide signal processing and interface management for external devices and sensors that connect through the input output port 918 during system operation. The input output component 920 may convert analog sensor signals into digital data formats that may be processed by the processor module 914, enabling real-time monitoring of pressure variations within the plenum chamber 118, valve positioning feedback, and environmental conditions that affect dust control system 110 performance. The input output component 920 may generate control signals that operate solenoid valves, pneumatic actuators, and other control devices based on commands from the processor module 914, providing precise timing control over valve positioning sequences during cleaning cycles and dust discharge operations. The input output component 920 may implement communication protocols that enable data exchange with external systems, remote monitoring equipment, and facility management networks while maintaining security and data integrity during network communications. The input output component 920 may provide diagnostic capabilities that monitor signal quality, detect communication failures, and identify sensor malfunctions that could affect system performance or safety during dust control operations.

A power supply module 922 may provide electrical power to the computing device 9000 components through connections to the central bus 910, ensuring reliable operation during varying facility power conditions and electrical disturbances that may occur in industrial environments. The power supply module 922 may incorporate voltage regulation, filtering, and protection circuits that provide stable electrical power to sensitive electronic components while isolating the computing device 9000 from electrical noise generated by industrial equipment operating in proximity to dust control system 110 installations. The power supply module 922 may include backup power capabilities such as battery systems or uninterruptible power supplies that maintain computing device 9000 operation during brief power interruptions, ensuring continuous system monitoring and control during facility power disturbances. The power supply module 922 may provide multiple voltage levels required by different components within the computing device 9000, including logic circuits, communication interfaces, and sensor power supplies that support comprehensive system functionality. The power supply module 922 may incorporate power monitoring capabilities that track electrical consumption, detect power quality issues, and provide diagnostic information that supports facility electrical system management and maintenance planning activities.

A radio module 924 may be connected to the central bus 910 to enable wireless communication capabilities that support remote monitoring, system coordination, and data transmission between multiple dust control system 110 installations without requiring extensive wiring infrastructure. The radio module 924 may implement wireless communication protocols that enable real-time data exchange between distributed dust control system 110 installations, allowing coordinated operation that prevents simultaneous cleaning cycles and optimizes compressed air supply 212 utilization across extended conveyor lines. The radio module 924 may provide remote access capabilities that enable facility operators and maintenance personnel to monitor system performance, adjust operational parameters, and receive alarm notifications from mobile devices or remote locations without requiring physical presence at individual dust control system 110 installations. The radio module 924 may support mesh networking capabilities that enable communication between multiple computing device 9000 installations, creating redundant communication pathways that maintain system coordination even when individual communication links may be interrupted by environmental conditions or equipment failures. The radio module 924 may incorporate security features that protect wireless communications from unauthorized access while ensuring reliable data transmission under varying environmental conditions encountered in industrial facilities.

The computing device 9000 may enable implementation of advanced control strategies that accommodate different types of conveyed materials with varying dust characteristics through programmable timing sequences and adaptive control algorithms. The processor module 914 may execute control programs that automatically adjust valve operation timing based on measured dust accumulation rates, cleaning pulse effectiveness, and environmental conditions that affect dust control system 110 performance during different operational scenarios. The memory module 912 may store operational profiles for different material types, enabling automatic system configuration changes when conveyor operations transition between different products or operational modes without requiring manual intervention by facility operators. The computing device 9000 may support different operational modes such as continuous cycling, demand-based operation, or scheduled maintenance cycles based on facility requirements and material handling schedules that vary throughout different operational periods.

In some cases, the computing device 9000 may incorporate heating elements for cold weather operation to prevent condensation or freezing that could affect electronic component performance or sensor accuracy during low-temperature environmental conditions. The heating elements may be controlled by the processor module 914 based on temperature sensor inputs that monitor ambient conditions and internal component temperatures, providing automatic thermal management that maintains reliable operation across varying seasonal conditions. The heating elements may be integrated within the computing device 9000 housing or positioned to protect external sensors and communication interfaces from ice formation or condensation that could compromise system functionality during cold weather operations. The power supply module 922 may provide electrical power for heating elements while maintaining sufficient capacity for normal computing device 9000 operations, ensuring that thermal management functions do not compromise primary control and monitoring capabilities.

Corrosion-resistant coatings or materials may be specified for the computing device 9000 housing and external components to provide protection in harsh chemical environments where corrosive substances may be present in the facility atmosphere or conveyed materials. The corrosion-resistant materials may include stainless steel housings, protective coatings, or specialized alloys that resist chemical attack from acids, bases, or other corrosive substances encountered in chemical processing, mining, or agricultural applications. The input output port 918 and external connections may incorporate corrosion-resistant materials and sealing systems that prevent chemical intrusion while maintaining reliable electrical connections and communication capabilities over extended service periods. The radio module 924 antenna systems and external communication interfaces may utilize corrosion-resistant materials that maintain signal transmission quality while resisting degradation from chemical exposure or environmental contamination.

Explosion-proof electrical components and static-dissipative materials may be used within the computing device 9000 for applications involving combustible dusts where ignition sources must be eliminated to prevent fire or explosion hazards. The explosion-proof components may include sealed housings, intrinsically safe circuits, and certified electrical interfaces that prevent electrical arcs or sparks from igniting combustible dust particles that may be present in the facility atmosphere. The static-dissipative materials may be incorporated in the computing device 9000 housing, cable connections, and external interfaces to prevent static electricity accumulation that could create ignition sources during dust handling operations. The power supply module 922 may incorporate intrinsically safe design features that limit electrical energy levels and prevent spark generation during normal operation or fault conditions that could occur in combustible dust environments.

Food-grade materials and sanitary design features may be incorporated within the computing device 9000 for pharmaceutical or food processing applications where contamination prevention and cleaning requirements apply to all facility equipment. The food-grade materials may include stainless steel housings, FDA-approved plastics, and nontoxic coatings that resist bacterial growth while accommodating frequent cleaning and sanitization procedures required in food processing environments. The sanitary design features may include smooth surfaces, sealed connections, and drainage provisions that prevent material accumulation and facilitate thorough cleaning during facility sanitization procedures. The input output port 918 and external connections may incorporate sanitary design principles that prevent contamination while maintaining reliable electrical connections and communication capabilities in food processing environments where hygiene standards apply to all facility equipment and systems.

The dust control system 110 disclosed herein may be adapted for various industrial applications beyond conveyor-mounted spot filters, as the fundamental principle of isolating cleaning pulses while maintaining controlled dust discharge applies to any equipment where spot filters are installed and isolation between the equipment and filter is needed during cleaning cycles. The invention may be modified to accommodate different equipment configurations, mounting arrangements, and operational requirements while maintaining the core functionality of cleaning pulse isolation and controlled dust transfer through sequential valve operations.

In pharmaceutical manufacturing facilities, the dust control system 110 may be adapted for use with tablet pressing equipment, powder mixing systems, and capsule filling operations where fine pharmaceutical dust must be contained to prevent cross-contamination between different drug products. The plenum walls 116 may be constructed from pharmaceutical-grade materials that resist chemical interaction with active pharmaceutical ingredients, while the valve seal(s)/gasket(s) may incorporate FDA-approved elastomeric compounds that maintain sealing integrity during frequent cleaning and sanitization procedures. The control system 200 may be modified to accommodate the stringent timing requirements and documentation needs of pharmaceutical manufacturing, with the computing device 9000 providing data logging capabilities that support regulatory compliance and batch record requirements.

Mining and mineral processing applications may utilize the dust control system 110 with conveyor transfer points, crusher discharge areas, and material handling equipment where respirable dust poses serious health hazards to workers. The housing components may be constructed from abrasion-resistant materials that withstand the mechanical wear associated with handling ore, coal, and processed minerals, while the plenum walls 116 may incorporate reinforced constructions that accommodate the higher dust loading and particle abrasiveness encountered in mining operations. The control system 200 may be modified to coordinate with mine ventilation systems and provide integration with facility-wide dust monitoring equipment that ensures compliance with occupational health regulations.

Chemical processing facilities handling powdered catalysts, pigments, specialty chemicals, and intermediate compounds may implement the dust control system 110 with reactor discharge systems, material transfer equipment, and packaging operations where explosive atmospheres and toxic exposures require precise dust containment. The system components may incorporate explosion-proof electrical designs and static-dissipative materials as described for the computing device 9000, while the plenum chamber 118 may include pressure relief capabilities that prevent over-pressurization during cleaning cycles involving reactive or combustible materials. The valve actuators and control circuits may utilize intrinsically safe designs that eliminate ignition sources while maintaining reliable operation in hazardous environments.

Cement and concrete production facilities may adapt the dust control system 110 for use with batching equipment, mixing systems, and material transfer operations where fine cement dust and silica-containing materials create regulatory compliance challenges and respiratory hazards. The housing construction may utilize corrosion-resistant materials that withstand the alkaline environment associated with cement processing, while the plenum walls 116 may be designed to accommodate the high dust volumes and abrasive characteristics of cement particles. The control system 200 may incorporate environmental monitoring interfaces that coordinate dust control operations with facility air quality management systems and regulatory reporting requirements.

Plastics and polymer processing operations may implement the dust control system 110 with pellet handling equipment, compounding systems, and recycling operations where electrostatically charged plastic particles create contamination and fire hazards. The system components may incorporate anti-static materials and grounding provisions that prevent static electricity accumulation, while the plenum chamber 118 may include humidity control features that minimize electrostatic charge generation during dust handling operations. The valve mechanisms may be designed to accommodate the flow characteristics of plastic particles, which may differ significantly from the granular materials typically encountered in agricultural applications.

Wood processing and biomass handling systems may utilize the dust control system 110 with sawmill equipment, pellet production systems, and material handling operations where combustible wood dust poses significant explosion and fire risks. The electrical components may incorporate explosion-proof designs similar to those described for chemical processing applications, while the plenum walls 116 may include fire suppression interfaces that integrate with facility safety systems. The control system 200 may incorporate spark detection and suppression capabilities that provide additional safety measures during operations involving combustible organic materials.

Metal powder manufacturing and processing facilities may adapt the dust control system 110 for use with atomization equipment, blending systems, and packaging operations where fine metallic particles create both explosion hazards and valuable material loss concerns. The housing construction may utilize non-sparking materials and designs that prevent ignition sources, while the intermediate dust collection chamber 120 may incorporate material recovery features that maximize the return of expensive metal powders to the production process. The control system 200 may include material tracking capabilities that monitor powder recovery rates and provide inventory management support for high-value metal processing operations.

Agricultural grain elevator and feed mill operations may implement the dust control system 110 with grain handling equipment, feed mixing systems, and storage operations where organic dusts create explosion hazards and product quality concerns. The system may be modified to accommodate the seasonal variations and moisture content changes associated with agricultural products, with the plenum walls 116 designed to prevent condensation and moisture accumulation that could affect product quality. The control system 200 may incorporate grain moisture monitoring and environmental control features that optimize dust control performance based on varying agricultural product characteristics throughout different harvest seasons.

The modular design approach described for the dust control system 110 may be extended to accommodate different equipment mounting configurations beyond conveyor installations, including vertical mounting for silo discharge systems, horizontal mounting for material transfer chutes, and inverted mounting for overhead equipment applications. The mounting plate 162 and connection flanges may be redesigned to accommodate different equipment interfaces while maintaining the sealed connections necessary for effective dust containment. The valve arrangements and airlock mechanisms may be reconfigured to accommodate different gravitational orientations and material flow patterns encountered in various industrial equipment installations.

The control system 200 may be adapted to interface with different types of industrial equipment control systems beyond spot dust filters, including baghouse controllers, cyclone separator systems, and central vacuum equipment that utilize similar cleaning pulse technologies. The regeneration signal 226 interception capability may be modified to accommodate different signal types, voltage levels, and communication protocols used by various equipment manufacturers. The timing sequences and valve coordination may be adjusted to accommodate different cleaning cycle characteristics and dust handling requirements associated with alternative filtration technologies and equipment configurations.

The following clauses represent example aspects of concepts contemplated herein. Any one of the following clauses may be combined in a multiple dependent manner to depend from one or more other clauses. Further, any combination of dependent clauses (clauses that explicitly depend from a previous clause) may be combined while staying within the scope of aspects contemplated herein. The following clauses are examples and are not limiting.

Clause 1: A dust control system for use with a spot dust filter mounted on industrial equipment, comprising: a housing positioned between the spot dust filter and the industrial equipment, the housing defining an internal chamber; a plenum within the housing configured to accommodate pressure changes; a first valve positioned to control airflow between the spot dust filter and the industrial equipment; a second valve and a third valve arranged in series to form an airlock mechanism for controlling dust discharge into the industrial equipment; and a control system configured to intercept a cleaning signal from the spot dust filter and coordinate operation of the first valve, second valve, and third valve to isolate cleaning pulses from the industrial equipment while allowing collected dust to be discharged into the industrial equipment through the airlock mechanism.

Clause 2: Clause 1, wherein the control system comprises a latching relay configured to receive the cleaning signal from the spot dust filter and a timer relay configured to control timing sequences for valve operations.

Clause 3: Clause 2, wherein the timer relay is adjustable to provide time delays between 3 seconds and 15 seconds for coordinating valve operations.

Clause 4: Any of Clauses 1-3, wherein the plenum comprises elastomeric walls configured to expand in response to compressed air pulses from the spot dust filter cleaning cycle.

Clause 5: Any of Clauses 1-4, wherein the first valve is a pneumatically actuated valve positioned in an air intake duct connecting the spot dust filter to the industrial equipment, the first valve being normally open and configured to close upon receipt of the cleaning signal.

Clause 6: Clause 5, wherein the second valve and third valve are pneumatically actuated valves positioned below the plenum, with the second valve being normally closed and positioned above the third valve.

Clause 7: Clause 6, wherein the control system is configured to operate the valves in a sequence comprising: closing the first valve, releasing the cleaning pulse signal to the spot dust filter, opening the second valve after a first predetermined time delay, closing the second valve after a second predetermined time delay, and opening the third valve to discharge collected dust into the industrial equipment.

Clause 8: A dust control system configured to: intercept a cleaning signal from a spot dust filter mounted on industrial equipment; close a first valve to isolate the spot dust filter from the industrial equipment in response to the cleaning signal; allow a cleaning pulse from the spot dust filter to be contained within a plenum; collect dust dislodged by the cleaning pulse within an intermediate chamber; sequentially operate a second valve and a third valve in an airlock configuration to discharge the collected dust into the industrial equipment while maintaining isolation between the spot dust filter and the industrial equipment; and reopen the first valve to restore normal filtration operation after dust discharge is complete.

Clause 9: Clause 8, wherein intercepting the cleaning signal comprises using a latching relay that receives a control signal from the spot dust filter and delays transmission of the cleaning pulse signal until the first valve is fully closed.

Clause 10: Clause 9, wherein the latching relay is coupled to a timer relay configured to provide adjustable time delays between valve operations.

Clause 11: Clause 10, wherein the timer relay provides time delays ranging from 3 seconds to 15 seconds for coordinating sequential operation of the second valve and third valve.

Clause 12: Any of Clauses 8-11, wherein the plenum comprises elastomeric walls that expand to accommodate compressed air from the cleaning pulse and contract to return to a normal operating configuration.

Clause 13: Any of Clauses 8-12, wherein the first valve, second valve, and third valve are pneumatically actuated valves operated using compressed air supplied to the spot dust filter.

Clause 14: A method of controlling dust emissions from a spot dust filter mounted on industrial equipment, comprising: intercepting, by a control system, a cleaning signal generated by the spot dust filter; closing, by the control system, a first valve positioned between the spot dust filter and the industrial equipment in response to the cleaning signal; releasing, by the control system, the cleaning signal to the spot dust filter to generate a cleaning pulse that is contained within a plenum; opening, by the control system, a second valve to transfer collected dust dislodged by the cleaning pulse from the plenum to an intermediate chamber while the first valve remains closed; closing, by the control system, the second valve and opening a third valve to discharge the collected dust into the industrial equipment; closing, by the control system, the third valve; and reopening, by the control system, the first valve to resume normal filtration operation.

Clause 15: Clause 14, wherein intercepting, by the control system, the cleaning signal comprises using a latching relay to receive a control signal from the spot dust filter and delay transmission of a cleaning pulse signal until the first valve is fully closed.

Clause 16: Clause 15, wherein the latching relay is coupled to a timer relay configured to provide adjustable time delays between valve operations.

Clause 17: Clause 16, wherein the timer relay provides time delays ranging from 3 seconds to 15 seconds for coordinating sequential operation of the second valve and third valve.

Clause 18: Any of Clauses 14-17, wherein the plenum comprises elastomeric walls that expand to accommodate compressed air from the cleaning pulse and contract to return to a normal operating configuration.

Clause 19: Any of Clauses 14-18, wherein the first valve, second valve, and third valve are pneumatically actuated valves operated using compressed air supplied to the spot dust filter.

Clause 20: Clause 19, wherein closing, by the control system, the first valve, opening, by the control system, the second valve, and opening, by the control system, the third valve each comprise activating a solenoid valve to direct compressed air to a pneumatic actuator associated with each respective valve.

In the preceding detailed description, reference is made to the accompanying drawings, which form a part hereof. In the drawings, similar symbols identify similar components, unless context dictates otherwise. The illustrative examples described in the detailed description and drawings are not meant to be limiting and are for explanatory purposes. Other examples may be utilized, and other changes may be made, without departing from the spirit or scope of the subject matter presented herein. It will be readily understood that the aspects of the present disclosure, as generally described herein and illustrated in the drawings, may be arranged, substituted, combined, and designed in a wide variety of different configurations, each of which are explicitly contemplated and form a part of this disclosure.

It should be noted that some of the terms used herein may be relative terms. For example, the terms "upper" and "lower" and the terms "forward" (or "front") and "rearward" (or "rear" or "back") are relative to each other in location, i.e., an upper component is located at a higher elevation than a lower component in a given orientation, but these terms may change if the device is flipped. An intermediate component, on the other hand, may be located between an upper component and a lower component regardless of orientation. The terms "horizontal" and "vertical" are used to indicate direction relative to an absolute reference, i.e., ground level. However, these terms should not be construed to require structures to be absolutely parallel or absolutely perpendicular to each other. For example, a first vertical structure and a second vertical structure are not necessarily parallel to each other. The terms "top" and "bottom" are used to refer to surfaces where the top is always higher than the bottom relative to an absolute reference, i.e., the surface of the Earth when the component is used as intended. The terms "upwards" or "upwardly" and "downwards" or "downwardly" are also relative to an absolute reference; upwards is always against the gravity of the earth. The terms "forward" and "rearward" or "rear" with respect to a position or orientation are opposite one another along a common direction, and an "intermediate" position is always located between a forward position and a rearward position.

The terms "operative to" and "configured to" and similar terms are used herein to describe that a particular component has certain structural features designed to perform a designated function. Such components should be construed as having the expressed structure, with the designated function being considered part of the structure.

"A," "an," "the," "at least one," and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; or nearly). If the imprecision provided by "about" is not otherwise understood in the art with this ordinary meaning, then "about" as used herein indicates at least variations that may arise from ordinary methods of measuring and using such parameters. As used in the description and the accompanying claims, a value is considered to be "approximately" equal to a stated value if it is neither more than 5 percent greater than nor more than 5 percent less than the stated value. In addition, a disclosure of a range is to be understood as specifically disclosing all values and further divided ranges within the range.

The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated aspects and aspects. Those having ordinary skill in the art will recognize that terms such as "above," "below," "upward," "downward," "top," "bottom," etc., may be used descriptively relative to the figures, without representing limitations on the scope of the disclosure, as defined by the claims.

In the preceding detailed description, reference is made to the accompanying drawings which form a part hereof wherein like numerals designate like parts throughout, and in which is shown, by way of illustration, aspects that may be practiced. It is to be understood that other aspects may be utilized and structural or logical changes may be made without departing from the scope of the present disclosure. Therefore, the preceding detailed description is not to be taken in the limiting sense, and the scope of aspects is defined by the appended claims and their equivalents.

The invention claimed is:

1. A dust control system for use with a spot dust filter mounted on industrial equipment, comprising:
   a housing positioned between the spot dust filter and the industrial equipment, the housing defining an internal chamber;
   a plenum within the housing configured to accommodate pressure changes;

a first valve positioned to control airflow between the spot dust filter and the industrial equipment;

a second valve and a third valve arranged in series to form an airlock mechanism for controlling dust discharge into the industrial equipment; and a control system configured to intercept a cleaning signal from the spot dust filter and coordinate operation of the first valve, second valve, and third valve to isolate cleaning pulses of the spot dust filter from the industrial equipment while allowing collected dust to be discharged into the industrial equipment through the airlock mechanism.

2. The dust control system of claim 1, wherein the control system comprises a latching relay configured to receive the cleaning signal from the spot dust filter and a timer relay configured to control timing sequences for valve operations.

3. The dust control system of claim 2, wherein the timer relay is adjustable to provide time delays between 3 seconds and 15 seconds for coordinating valve operations.

4. The dust control system of claim 1, wherein the plenum comprises elastomeric walls configured to expand in response to the cleaning pulses of the spot dust filter.

5. The dust control system of claim 1, wherein the first valve is a pneumatically actuated valve positioned in an air intake duct connecting the spot dust filter to the industrial equipment, the first valve being normally open and configured to close upon receipt of the cleaning signal.

6. The dust control system of claim 5, wherein the second valve and third valve are pneumatically actuated valves positioned below the plenum, with the second valve being normally closed and positioned above the third valve.

7. The dust control system of claim 6, wherein the control system is configured to operate the valves in a sequence comprising: closing the first valve, releasing the intercepted cleaning signal to the spot dust filter, opening the second valve after a first predetermined time delay, closing the second valve after a second predetermined time delay, and opening the third valve to discharge collected dust into the industrial equipment.

8. A dust control system configured to:

intercept a cleaning signal from a spot dust filter mounted on industrial equipment;

close a first valve to isolate the spot dust filter from the industrial equipment in response to the cleaning signal;

allow a cleaning pulse from the spot dust filter to be contained within a plenum;

collect dust dislodged by the cleaning pulse within an intermediate chamber;

sequentially operate a second valve and a third valve in an airlock configuration to discharge the collected dust into the industrial equipment while maintaining isolation between the spot dust filter and the industrial equipment; and reopen the first valve to restore normal filtration operation after dust discharge is complete.

9. The dust control system of claim 8, wherein intercepting the cleaning signal comprises using a latching relay that receives a control signal from the spot dust filter and delays transmission of the cleaning signal until the first valve is fully closed.

10. The dust control system of claim 9, wherein the latching relay is coupled to a timer relay configured to provide adjustable time delays between valve operations.

11. The dust control system of claim 10, wherein the timer relay provides time delays ranging from 3 seconds to 15 seconds for coordinating sequential operation of the second valve and third valve.

12. The dust control system of claim 8, wherein the plenum comprises elastomeric walls that expand to accommodate the cleaning pulse and contract to return to a normal operating configuration.

13. The dust control system of claim 8, wherein the first valve, second valve, and third valve are pneumatically actuated valves operated using compressed air supplied to the spot dust filter.

14. A method of controlling dust emissions from a spot dust filter mounted on industrial equipment, comprising:

intercepting, by a control system, a cleaning signal generated by the spot dust filter;

closing, by the control system, a first valve positioned between the spot dust filter and the industrial equipment in response to the cleaning signal;

releasing, by the control system, the cleaning signal to the spot dust filter to generate a cleaning pulse that is contained within a plenum;

opening, by the control system, a second valve to transfer collected dust dislodged by the cleaning pulse from the plenum to an intermediate chamber while the first valve remains closed;

closing, by the control system, the second valve and opening a third valve to discharge the collected dust into the industrial equipment;

closing, by the control system, the third valve; and reopening, by the control system, the first valve to resume normal filtration operation.

15. The method of claim 14, wherein intercepting, by the control system, the cleaning signal comprises using a latching relay to receive a control signal from the spot dust filter and delay transmission of a cleaning pulse signal until the first valve is fully closed.

16. The method of claim 15, wherein the latching relay is coupled to a timer relay configured to provide adjustable time delays between valve operations.

17. The method of claim 16, wherein the timer relay provides time delays ranging from 3 seconds to 15 seconds for coordinating sequential operation of the second valve and third valve.

18. The method of claim 14, wherein the plenum comprises elastomeric walls that expand to accommodate the cleaning pulse and contract to return to a normal operating configuration.

19. The method of claim 14, wherein the first valve, second valve, and third valve are pneumatically actuated valves operated using compressed air supplied to the spot dust filter.

20. The method of claim 19, wherein closing, by the control system, the first valve, opening, by the control system, the second valve, and opening, by the control system, the third valve each comprise activating a solenoid valve to direct compressed air to a pneumatic actuator associated with each respective valve.

* * * * *